Feb. 1, 1966 R. ADLER 3,233,182
PARAMETRIC ELECTRONIC SIGNAL AMPLIFYING METHODS AND APPARATUS
Filed May 28, 1958 6 Sheets-Sheet 1
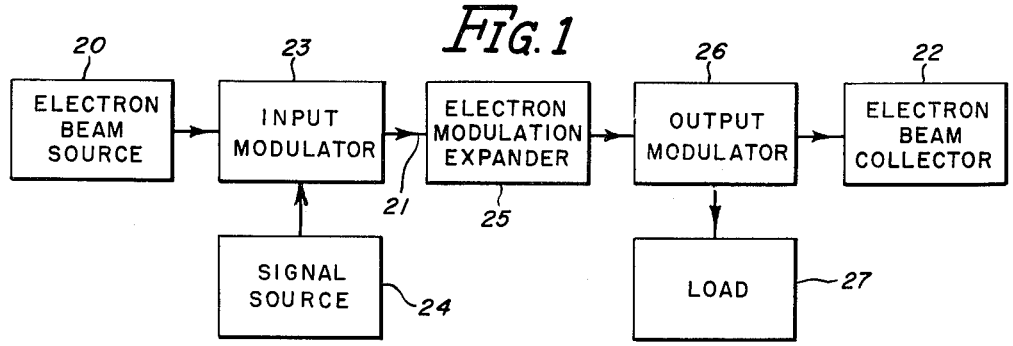
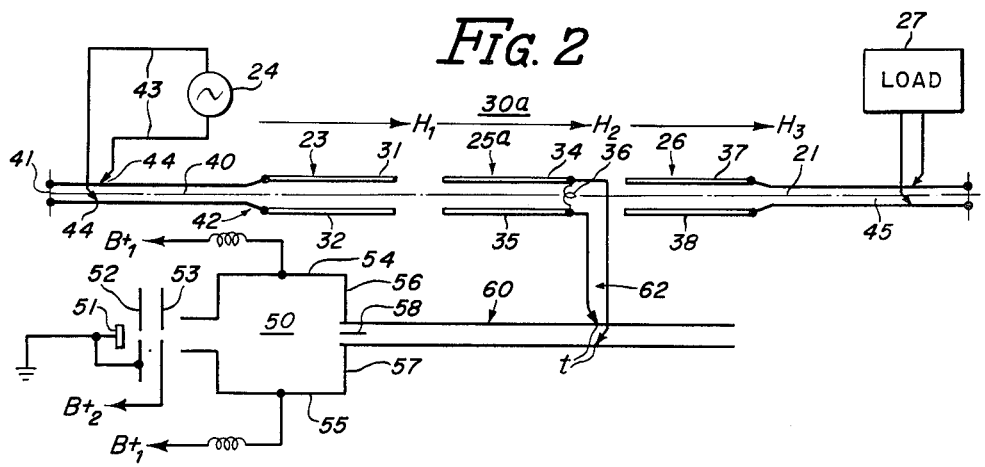
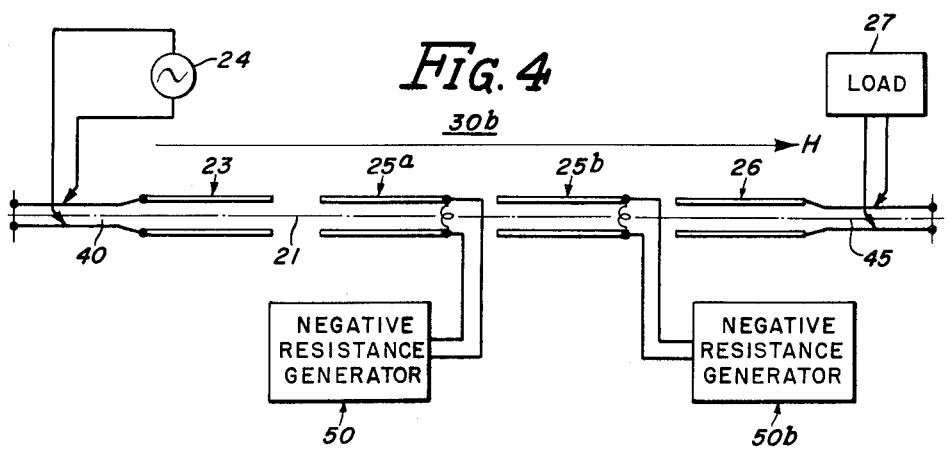
INVENTOR
Robert Adler
BY Hugh H. Drake
ATTORNEY

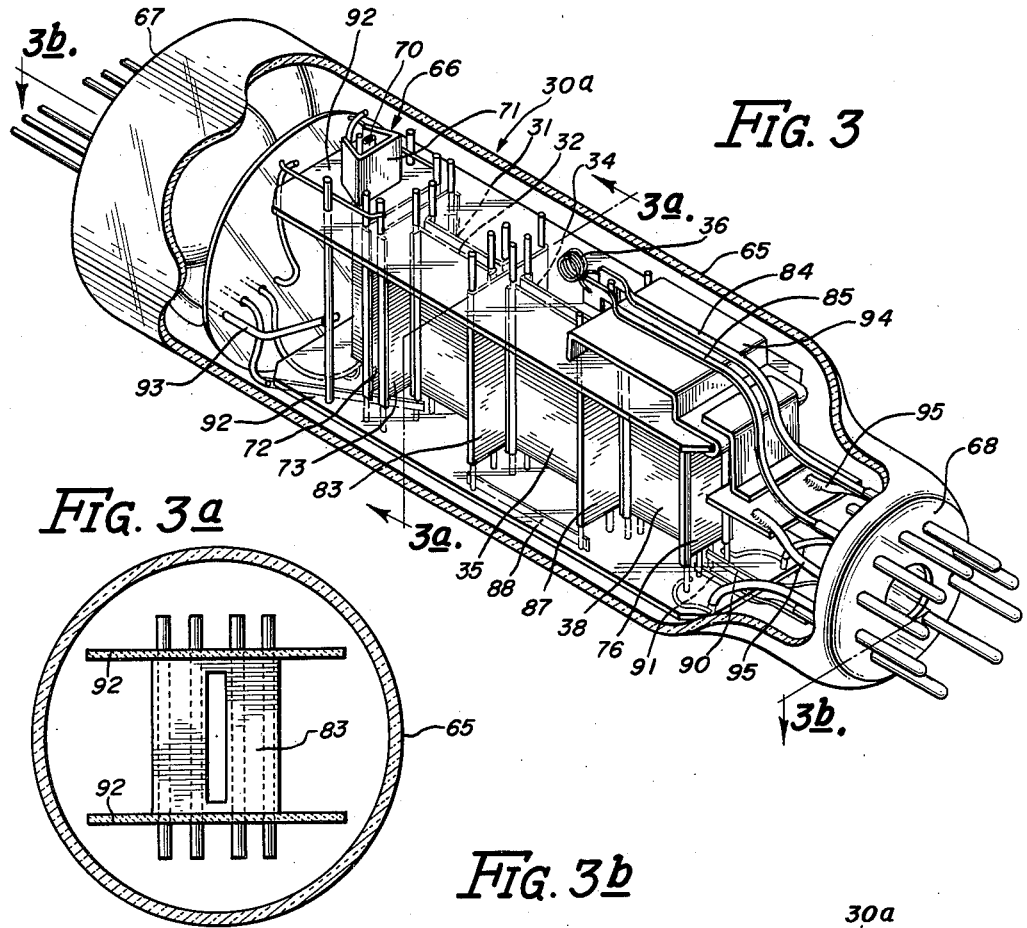
FIG. 3
FIG. 3a
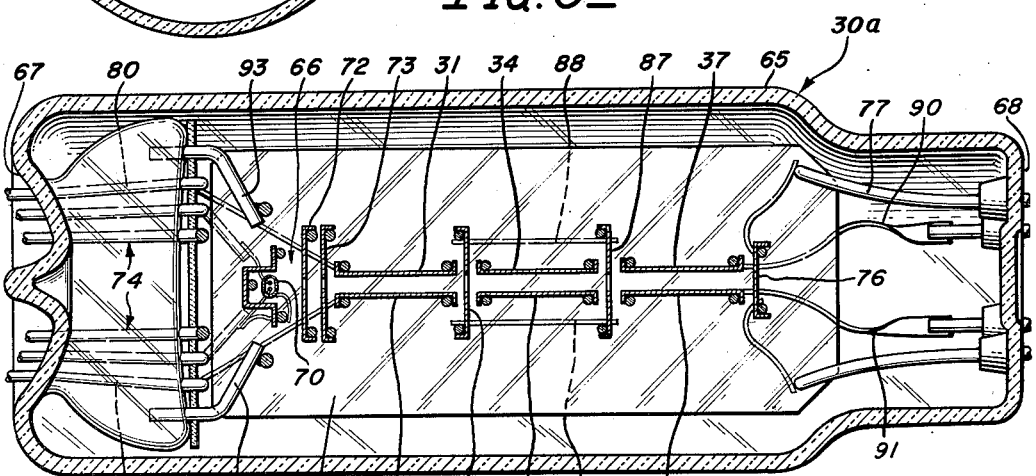
FIG. 3b
INVENTOR
Robert Adler
BY Hugh N. Drake
ATTORNEY Feb. 1, 1966
R. ADLER
3,233,182
PARAMETRIC ELECTRONIC SIGNAL AMPLIFYING METHODS AND APPARATUS
Filed May 28, 1958
6 Sheets-Sheet 3
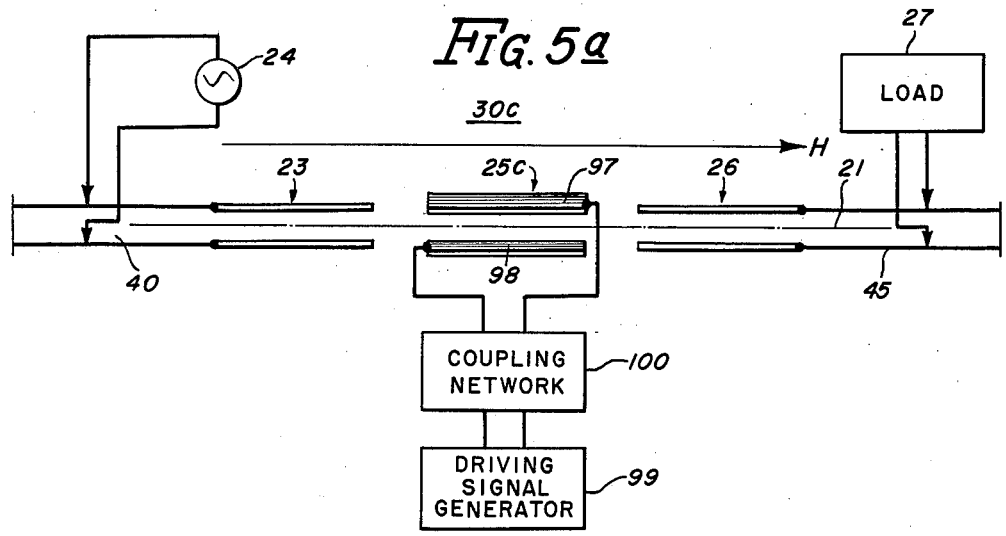
*Fig. 5a*
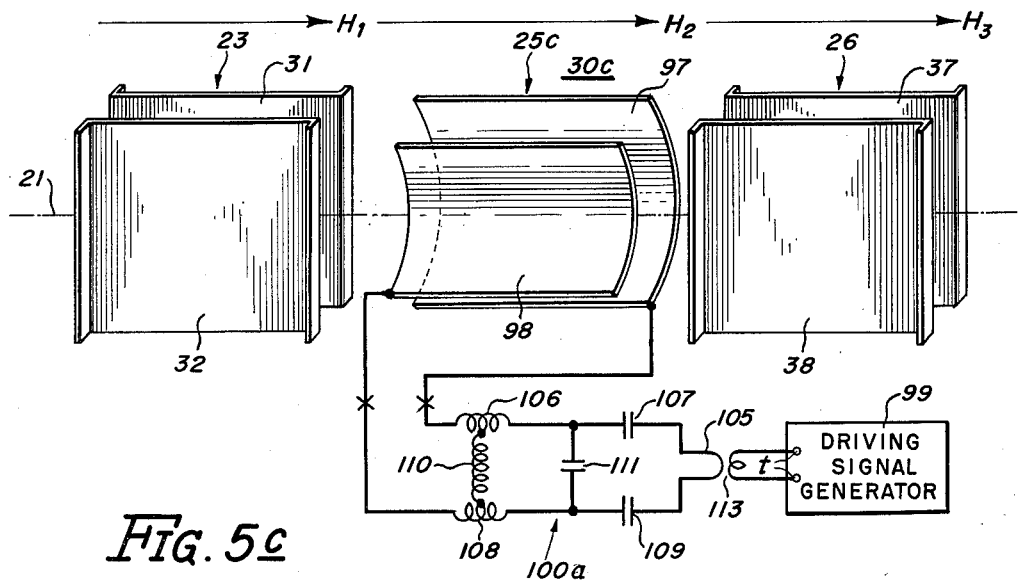
*Fig. 5b*
*Fig. 5c*
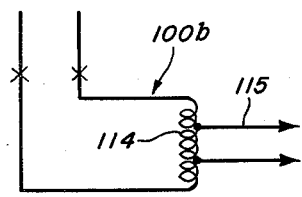
INVENTOR
Robert Adler
BY Hugh N. Drake
ATTORNEY Feb. 1, 1966 R. ADLER 3,233,182
PARAMETRIC ELECTRONIC SIGNAL AMPLIFYING METHODS AND APPARATUS
Filed May 28, 1958 6 Sheets-Sheet 4
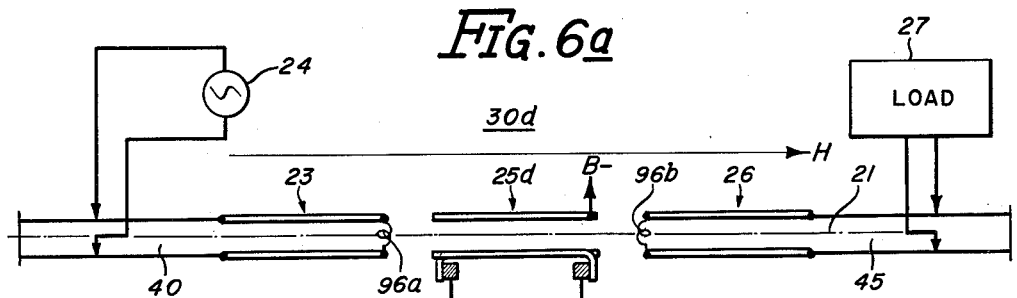
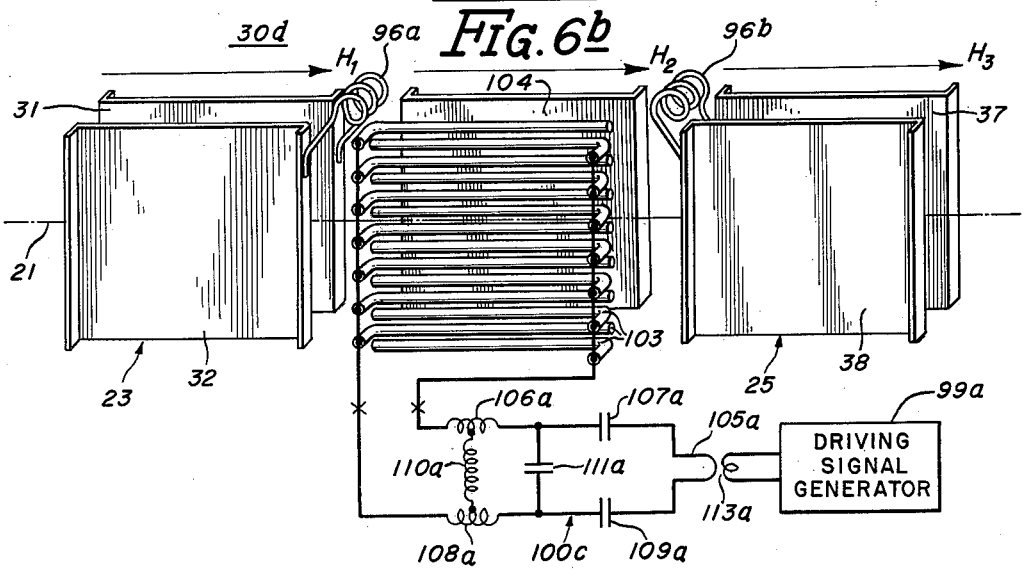
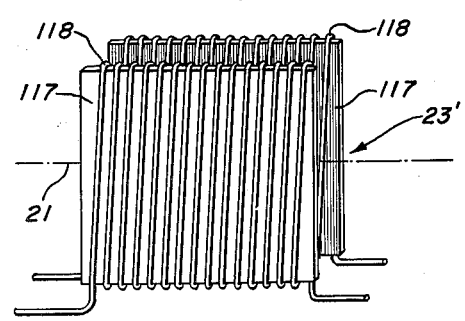
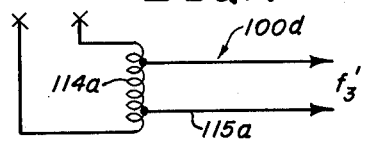
INVENTOR
Robert Adler
BY Hugh N. Drake
ATTORNEY

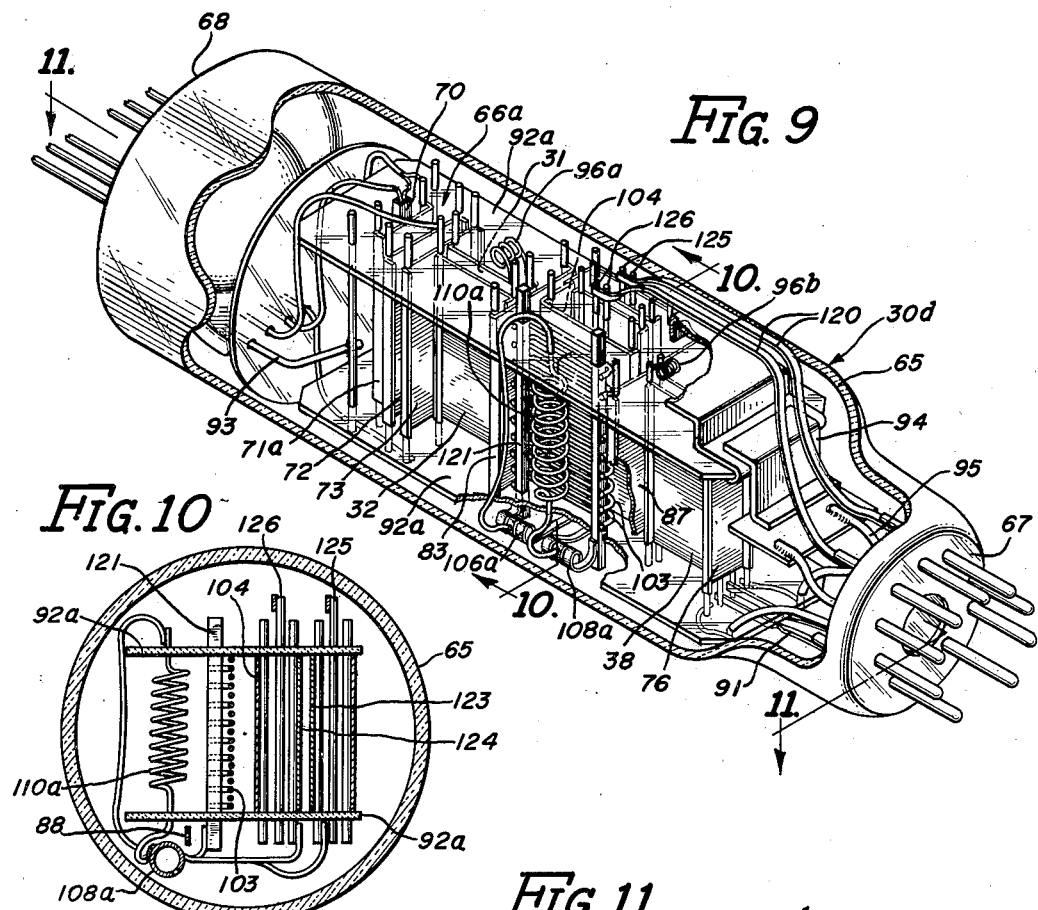
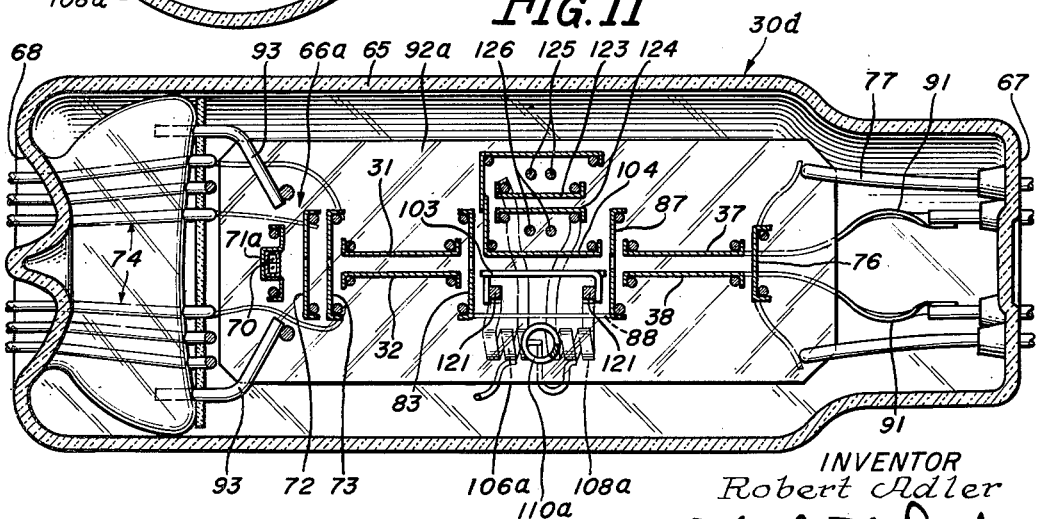

Feb. 1, 1966  R. ADLER  3,233,182
PARAMETRIC ELECTRONIC SIGNAL AMPLIFYING METHODS AND APPARATUS
Filed May 28, 1958  6 Sheets-Sheet 6
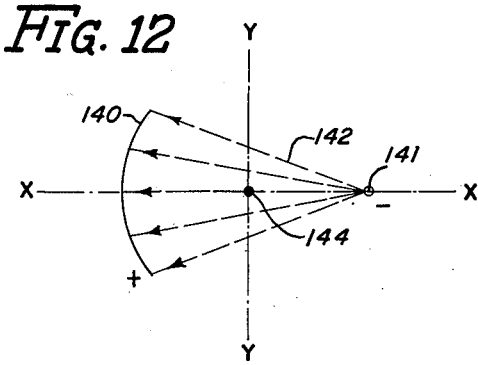
FIG. 12
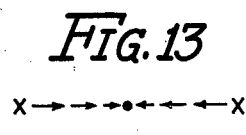
FIG. 19
FIG. 13
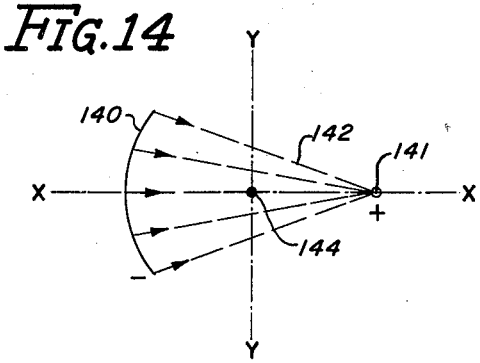
FIG. 14
FIG. 20
FIG. 15
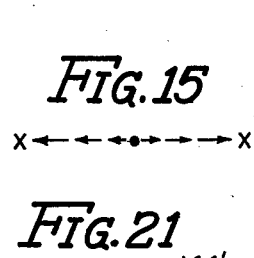
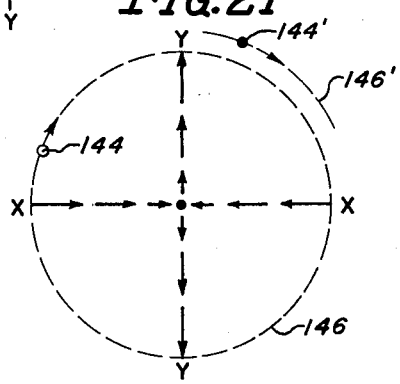
FIG. 21
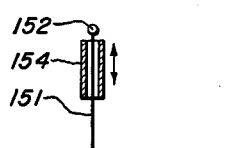
FIG. 16  FIG. 17
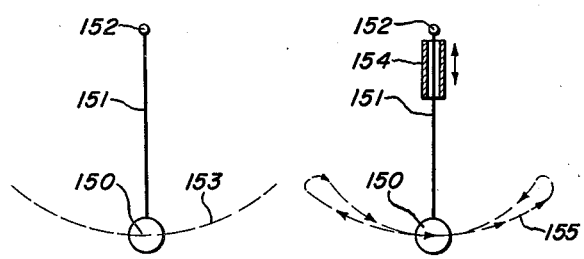
FIG. 18
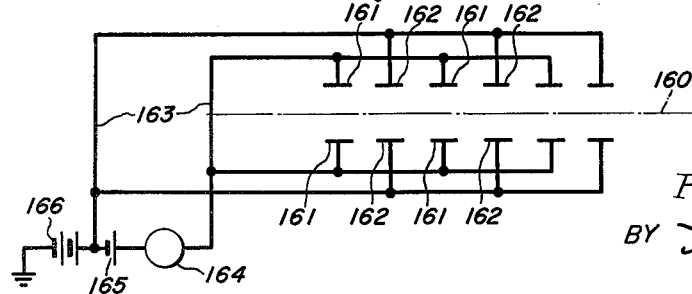
INVENTOR
Robert Adler
BY Hugh N. Drake
ATTORNEY

United States Patent Office 3,233,182
Patented Feb. 1, 1966

3,233,182
PARAMETRIC ELECTRONIC SIGNAL AMPLIFY-
ING METHODS AND APPARATUS
Robert Adler, Northfield, Ill., assignor to Zenith Radio
Corporation, a corporation of Delaware
Filed May 28, 1958, Ser. No. 738,546
52 Claims. (Cl. 330—4.7)

This invention relates to electronic signal-amplifying systems and devices.

It has heretofore been known that interaction between electron beams and circuits placed alongside such beams can take at least two different forms. Two distinct electron waves can exist in an electron beam at a given frequency as described in more detail in an article entitled "Transverse-Field Traveling-Wave Tubes with Periodic Electrostatic Focusing," by R. Adler et al., appearing in the "Proceedings of the IRE," volume 44, No. 1, January 1956, at pp. 82–89. A simplified interpretation of the electron-wave action may be developed by considering the electron beam as subject to a restoring force derived from the focusing field in transverse-field tubes and the space charge in longitudinal-field tubes. This restoring force enables each electron in the beam to oscillate about its rest position in the beam at a frequency often referred to as the plasma frequency in longitudinal-field tubes and as the cyclotron frequency or transverse-resonant frequency in transverse-field tubes.

Motion of the electrons in the beam at this electron-resonant frequency, once excited, persists until disturbed. To excite this motion by means of a helix or equivalent circuit, the velocity of wave propagation on the circuit must be such that the electrons, traveling at a different velocity, "see" a signal field at their own resonant frequency.

The circuit wave may be either faster or slower than the beam. The phase velocity $u$ of this wave is a function of the velocity $u_e$ of electron travel, the signal frequency $f_1$ and the electron resonant frequency $f_e$ as follows:

$$u = u_e \frac{1}{1 \pm \frac{f_e}{f_1}}$$

Interaction between electron motions and signal fields leads to different results in the two different cases. For a circuit wave slower than that of the beam, phase relations are such that in-phase signals on the beam and the circuit tend to augment each other and produce exponential amplification; this is the mechanism conventionally used in traveling-wave tubes. At the same time, out-of-phase signals on the beam and the circuit tend to suppress each other and produce exponential attenuation.

When a circuit wave is faster than that of the beam, the phase relationships are such that when the signal on the circuit augments the motion on the electron beam that same motion has the effect of reducing the signal on the circuit and vice-versa. As a result of this interrelationship, a signal traveling on the circuit will eventually disappear from the circuit and at the same time appear on the stream. Subsequently the signal will re-appear on the circuit. Conversely, a signal originating on the beam is transferred to the circuit and, further on, is transferred back to the beam. This is a standing-wave phenomenon analogous to the standing waves observed on coupled transmission lines. However, the energy interchange mechanism is not limited to the use of transmission lines. It is known to the art that lumped structures may be arranged to interact with the beam in an equivalent manner.

One interesting aspect of the phenomenon of beam-and-circuit signal interchange is the existence of points along the beam where, at a given signal frequency, all of the signal impressed upon the circuit is transferred to the beam as modulation of the specific character of beam interaction employed and all of the energy originally present in the beam as modulation of the same character is transferred to the circuit. This interchange of energy between the beam and the circuit is limited to the specific mode of electron motion which constitutes the faster of the two possible electron waves at the particular signal frequency.

A useful application of the energy interchange phenomenon lies in the interchange of noise and signal energy. It is well known that an electron beam developed from conventional sources includes various noise components appearing as modulation on the beam. By utilizing fast-wave interaction, it is possible to transfer a desired signal to the beam while extracting the noise components therefrom. In addition, induced noise may be minimized; such noise is induced by the beam in conventional electron-beam modulator structures and is then once more impressed upon the beam. A system for interacting with an electron beam to absorb noise is described and claimed in Patent 2,832,001, issued April 22, 1958, to Robert Adler, for Electron Discharge Systems, and assigned to the same assignee as the present invention. The noise absorption system disclosed in that patent may be used for either or both of removing original beam noise and modulating the beam with signal energy while avoiding induced noise. While certain of the embodiments of the patent take either full or partial advantage of the capabilities of the noise absorption system, others of the embodiments directed to signal amplifying systems fail to achieve truly minimum noise.

It is accordingly one object of the present invention to provide a method of and apparatus for amplifying signal energy while minimizing noise in an electron beam device.

It is another object of the present invention to provide a method of and apparatus for employing fast-electron-wave interaction and from which positive gain is realized.

It is still another object of the present invention to provide fast-electron-wave apparatus productive of positive signal gain while at the same time minimizing noise.

A further object of the present invention is to provide an electron beam amplifier employing fast-electron-wave interaction and which amplifies signals over a wide range of frequencies.

Still further, it is an object of the present invention to provide a new and improved method of amplification and an electron beam amplifier in which the level of an applied signal is increased while minimizing the transmission of noise energy components, that is, to develop substantial signal gains while at the same time maximizing signal to noise ratio.

Another aim of the present invention is to provide a new and improved method of and apparatus for amplifying signal energy in an electron beam.

A related aim of the invention is to provide a new and improved method of and apparatus for amplifying signal energy in an electron beam and which is capable of increasing signal energy without contributing noise energy.

It is also an object of the invention to provide a new and improved method of and apparatus for amplifying signal energy in an electron beam device and which is capable of realizing fully the advantages of the noise absorption system disclosed in the aforesaid patent but which also may be advantageously utilized in combination with a wide variety of more conventional electron beam apparatus.

An amplifying device, in accordance with the present invention, comprises an electron source for projecting an electron beam along a predetermined path terminating in a collector for eventually receiving the electron beam. Spaced along the beam path between source and collector are several components including means disposed along a first portion of the path and responsive to applied signal energy for modulating the beam. Next along the path toward the collector are means for expanding the beam modulation. Subsequent to modulation expansion, the beam is acted upon by means responsive to the beam modulation for extracting signal energy from the beam.

While the expanding means may take various forms, its preferred forms are those which parametrically amplify electron signal motion. A parametric amplifier is a device in which a reactance which is part of a transmission system is varied periodically by an external energy source. The parametric amplifiers of the invention include means responsive to a driving signal and means for establishing an electron-resonant frequency for the electrons passing through the expander. A field derived from the driving-signal energy has a restoring-force component varying in proper phase with respect to the signal motion to impart energy thereto.

Although it is contemplated to utilize the expanders of the present invention together with conventional electron beam modulators and demodulators as input-signal and output-signal couplers, decided advantages are realized by employing, at least for the modulator, coupling means which interact with the beam to impart signal energy thereto while extracting noise energy therefrom. The inventive principles are utilized to their greatest extent when the modulator, expander, and demodulator all interact with the fast-electron-wave.

In its method aspects, the invention includes the steps of projecting an electron beam along a predetermined path and imparting to electrons in the beam motion representative of signal energy components. Positive gain is realized by parametrically amplifying this electron motion after which an output signal is derived from the amplified electron motion. The parametric amplification may be achieved by establishing a resonant frequency for the beam electrons which have been modulated with the signal energy and subjecting the electrons to a time variable inhomogeneous field.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIGURE 1 is a block-diagrammatic illustration of apparatus constructed in accordance with the present invention;

FIGURE 2 is a schematic diagram of an embodiment of the present invention;

FIGURE 3 is a perspective view of apparatus corresponding to that shown in FIGURE 2;

FIGURE 3a is a cross-sectional view taken along lines 3a—3a in FIGURE 3 and FIGURE 3b is a cros-sectional view taken along the lines 3b—3b in FIGURE 3;

FIGURE 4 illustrates schematically another embodiment of the invention similar to that shown in FIGURE 2;

FIGURE 5a illustrates schematically still another embodiment of the invention;

FIGURE 5b is a fragmentary perspective and schematic view of the apparatus illustrated in FIGURE 5a;

FIGURE 5c is a schematic diagram of an alternative portion of the apparatus of FIGURE 5b;

FIGURE 6a is a schematic illustration of a further embodiment of the present invention;

FIGURE 6b is a fragmentary perspective and schematic view of the apparatus illustrated in FIGURE 6a;

FIGURE 7 is a schematic diagram of an alternative arrangement for a portion of the apparatus shown in FIGURE 6b;

FIGURE 8 is a fragmentary perspective view of an alternative portion of the apparatus shown in FIGURE 6b;

FIGURE 9 is a perspective view of apparatus corresponding to that shown in FIGURES 6a and 6b;

FIGURE 10 is a cross-sectional view taken along the lines 10—10 in FIGURE 9;

FIGURE 11 is a cross-sectional view taken along the line 11—11 of FIGURE 9;

FIGURES 12–15 are diagrams useful in explaining different forms of the invention;

FIGURES 16 and 17 are illustrations of a mechanical analogy of certain forms of the invention;

FIGURE 18 is a schematic diagram illustrating an alternative embodiment of the invention; and FIGURES 19–21 are additional diagrams useful in explaining various forms of the invention.

In FIGURE 1, an electron beam is projected from an electron beam source 20 along a reference path 21 toward an electron beam collector 22. Source 20 may be entirely conventional and preferably includes the usual cathode together with suitable focusing and accelerating electrodes for developing a well defined beam or stream of electrons. Collector 22 is disposed transversely of the beam and may conventionally include an anode electrode biased at a positive potential.

Disposed in a first portion of beam path 21 beyond source 20 is modulator 23 coupled to a signal source 24. Modulator 23 is an electron coupler capable of imparting energy to the electron beam in response to signal received from source 24. Modulator 23 may take various forms, acting upon the electron beam to produce transverse, longitudinal, or a combination of transverse and longitudinal motion of the electrons in the beam. Preferably, modulator 23 includes means, such as a magnetic or electrostatic field, for establishing an electron-resonant frequency for beam-modulation electron motion. A typical such assembly, for transverse electron motion, includes a solenoid surrounding the beam to establish lines of magnetic flux parallel to the beam path and of a strength establishing a selected cyclotron frequency for electron motion; modulation signals derived from source 24 and having a frequency similar to the cyclotron frequency cause the electrons in the beam to orbit in an expanding helical path. The amplitude of the modulation signal energy in this particular modulator is represented in the beam by the radius of orbital motion as the beam leaves the modulator.

Any of several known energy-transfer mechanisms, including, for the case of transverse motion, transmission lines and deflection plates spaced alongside the beam, may be utilized to modulate the beam with energy from source 24. A typical helical-line coupling structure for transverse modulation of the beam is illustrated and described with respect to FIGURE 1 of the aforementioned article in the January 1956, "Proceedings of the IRE." Alternatively, input modulator 23 may include means for establishing a selected plasma frequency for the electron beam together with means for imposing longitudinal motion upon the electron beam in response to space-charge modulation thereof.

Following input modulator 23 and disposed alongside a second portion of beam path 21 beyond modulator 23 is an electron modulation expander 25. On beyond expander 25 is a demodulator 26 disposed alongside a third portion of beam path 21 and coupled to a suitable load 27. Demodulator 26 may for convenience be identical with modulator 23 although other appropriate electron couplers may be utilized. Operation of demodulator 26 is the reverse of that of the modulator. Motions of the electrons in the beam react with demodulator 26 to transfer energy from the beam to the demodulator from where it is fed to load 27 by conventional coupling circuitry.

Neglecting for a moment the action of modulation expander 25, and assuming a demodulator identical to the modulator and both properly matched to source 24 and load 27, respectively, signal energy from source 24 is transformed into motion of electrons in the beam. In demodulator 26, the energy represented by this electron motion is extracted and fed to load 27, the beam emerging from demodulator 26 then having the same character as it had in its approach to modulator 23.

The net result of the apparatus as thus far described, ignoring expander 25, is to transfer signal energy from source 24 to load 27 by way of the electron beam. The usefulness of such an arrangement, without additional refinement, suffers from the disadvantage that excess noise is introduced into the signal. This noise is carried by the electron beam and appears as energy components which are added to the signal components. Typical of such electron-beam noise is that originating in source 20. Additional beam-component energy may also be present in the form of other signal energy applied to the electron beam prior to its passage through modulator 23.

In the present apparatus it is contemplated to remove such energy components, at least those corresponding to the modulation-mode effected by modulator 23, existing in the beam as it enters modulator 23. To this end, modulator 23 is constructed to react with the fast electron wave in the manner described in the introduction to the present specification. Thus, for transverse-mode modulation the interaction elements of modulator 23 have an effective electrical length along beam path 21 such that all fast-wave energy components originally in the beam are transferred to the modulator circuit while the energy from signal source 24 is transferred to the beam. As a result, the electron beam leaving input modulator 23 and traveling toward modulation expander 25 contains energy corresponding to the signal energy supplied by source 24, while containing but a minimum, if any, other fast-wave energies such as that originally appearing on the beam in the form of noise.

Returning now to electron modulation expander 25, it includes means for increasing the amplitude of electron motion imposed upon the beam by modulator 23 in response to signals from source 24. For example, when modulator 23 is characterized by means for causing electrons in the beam to describe helical orbits in response to signals from source 24, expander 25 causes an increase in the orbital radii during passage of the beam electrons through the expander.

To summarize the operation of the apparatus illustrated in FIGURE 1, an electron beam, which may contain modulation representing noise energy components, passes through modulator 23. In response to a signal from source 24, modulator 23 imposes modulation of a preselected character upon the beam passing therethrough; preferably, modulator 23 interchanges the signal energy from source 24 with the energy components initially present in the electron beam. The electron beam then traverses modulation expander 25 wherein the signal motion created in modulator 23 is expanded. Subsequently, when the beam passes through demodulator 26, the expanded signal motion is utilized to develop an output signal which is fed to load 27.

FIGURE 2 schematically illustrates one physical embodiment of apparatus corresponding to that shown and described with respect to FIGURE 1. In FIGURE 2, axis 21 represents the path within a tube 30a and along which the electron beam travels although electron beam source 20 and collector 22 have been omitted from this figure for purposes of clarity.

Disposed along the first portion of beam path 21 is modulator 23 which includes a pair of deflector plates 31 and 32 located individually on opposite sides of the beam path. Beyond deflectors 31 and 32 is electron modulation expander 25a which includes a second pair of deflectors 34 and 35 positioned in alignment with deflectors 31 and 32 and located along a second portion of beam path 21. Electrodes 34 and 35 are bridged by a coil 36. Still further along beam path 21 adjacent a third portion thereof is demodulator 26 which also includes a pair of receptors 37 and 38 aligned with the deflectors of modulator 23 and expander 25a.

For coupling signal source 24 to modulator 23, a transmission line 40 having one end 41 shorted is coupled at its other end 42 to deflectors 31 and 32. A transmission link 43 coupled at one end to source 24 is tapped as indicated at 44 onto transmission line 40 at a position adjusted to match the impedance of source 24 to that presented by deflectors 31 and 32. Transmission line 40 is effectively a quarter wavelength at the frequency of the signal from source 24; of course, line 40 may be physically longer by additional increments of one-half wavelength.

To establish an electron-resonant frequency approximately equal to the signal frequency along the first portion of beam path 21, the space between electrodes 31 and 32 is subjected to a magnetic field of a strength sufficient to establish for electrons in the beam a cyclotron frequency approximately equal to that of the source signal. To this end, deflectors 31 and 32 are placed within a solenoid indicated schematically by arrow $H_1$.

Output electrodes 37 and 38 preferably are identical with input electrodes 31 and 32. The portion of the electron beam path disposed between electrodes 37 and 38 is likewise subjected to a magnetic field of a strength sufficient to establish for electrons in the beam a cyclotron frequency approximately equal to the frequency of the signal from source 24. As in modulator 23, this field may be created by an ordinary solenoid coil encircling electrodes 37 and 38 as indicated diagrammatically by the arrow labeled $H_3$. In the present instance, it is most convenient to dispose the entire length of tube 30a within a single solenoid producing a constant homogeneous magnetic field throughout the beam path. However, separate solenoids may be desired when different field strengths are required as when demodulator 26 is of a different type of beam interaction device than modulator 23. Load 27 is coupled to demodulator 26 through a transmission line section 45 in a manner similar to that described above with respect to the coupling between source 24 and modulator 23.

Disregarding for a moment the effect of modulation expander 25a, the operation of the modulator and demodulator may be explained. In traveling through modulator 23, the electron beam proceeds in a direction parallel to that of the flux lines of the homogeneous magnetic field. The intensity of that field is adjusted to establish a restoring force acting along two orthogonal coordinates of the beam motion so that the cyclotron frequency corresponds to the applied signal frequency. In the present instance wherein transverse signal-modulation is utilized, the energy derived from signal source 24 causes each electron in the beam to describe a spiral of increasing radius as it travels through the modulator. In modulator 23, there is no interchange between transverse and longitudinal electron motion. To the signal source, the electron stream in the modulator looks like a pure resistance load; all of the energy given up to this load appears in the form of transverse electron motion.

Modulator 23 interacts efficiently with the fast electron wave but may also react with the slow electron wave on the beam. While lumped electrodes 31 and 32 interact inefficiently with the slow electron wave, such interaction with the slow wave is minimized, theoretically to zero, by making the effective electrical length of electrodes 31 and 32 equal to an integral multiple of the slow wavelength.

With the input modulator properly loaded by a suitable matching resistance, it will extract the fast-wave noise signal from the beam; this match is obtained by adjusting the position of tap 44 for minimum noise transmission to load 27. When the input loading is precisely adjusted, the fast electron wave theoretically contains no noise after leaving the input section except for thermal agitation noise generated in signal source 24. Thus, deflector electrodes 31 and 32 together with magnetic field $H_1$ cause the signal energy from source 24 to be interchanged with the energy originally contained in the beam and specifically with the fast-wave noise energy.

Still disregarding the effect of modulation expander 25a, the electrons leaving modulator 23 continue on a helical path of constant radius until reaching the demodulator. With load 27 tapped onto output transmission line 45 and the length of that line adjusted so that demodulator 26 sees a pure resistance, the orbiting electrons induce a field across receptors 37 and 38 which forces the electrons to spiral inwardly as they drift through demodulator 26.

For the present case wherein the modulator and demodulator are identical and both are properly matched to signal source 24 and load 27, respectively, so as to present to the beam the same resistance, the electrons eventually arriving at the collector are devoid of modulation. The entire energy modulated onto the beam by modulator 23 is extracted from the beam by demodulator 26.

In order to obtain useful gain, the present invention contemplates expanding the modulation imposed upon the beam in the modulator. To this end, the electron beam is subjected to a negative resistance load during its passage through the expander. In this embodiment, the negative resistance is derived from an external oscillator energy source 50. With the apparatus illustrated in FIGURE 2, wherein modulator 23 imposes an orbital motion upon the beam in response to input signal energy, modulation expansion is obtained by increasing the orbital radius of electron motion corresponding to that signal energy.

While source 50 may comprise any of various oscillator-type devices, it is preferred for ease of adjustment to utilize the transit-time oscillator disclosed in my Patent No. 2,758,210, entitled Oscillators, issued August 7, 1956, and assigned to the same assignee as the present invention. As employed here, the device is operated just below a state of actual oscillation. As shown in FIGURE 2 the oscillator comprises an electron gun assembly including a cathode 51, a focusing electrode 52, an accelerating electrode 53, deflector electrodes 54 and 55, and anodes 56 and 57 coupled to the deflector electrodes. A suppressor electrode 58 is disposed in alignment with the electron beam trajectory between anodes 56 and 57.

A detailed understanding of the operation of this device may be had by reference to the aforesaid patent. It will suffice for the present to note that the centers of deflectors 54 and 55 are spaced from the anodes by a predetermined distance which corresponds to an electron angle, for the velocity determined by the potential level of the deflectors, of approximately one-half cycle at the desired frequency.

In operation, the anodes are coupled to a resonant circuit 60 tuned to a frequency having a resonance period which is substantially equal to twice the electron transit time required for the electrons of the beam to traverse the distance between the deflector center and the anodes. For this purpose, anodes 56 and 57 are electrically connected to an open-ended transmission line of an effective length greater than one-quarter wavelength and less than one-half wavelength at the operating frequency.

Electrodes 34 and 35 of expander 25a, tuned to the signal frequency by the inductance of coil 36, are coupled to transmission line 60 by a transmission line 62 which has an effective quarter-wavelength at the operating frequency. With oscillator 50 energized, the resistance appearing across the ends of line 62 tapped onto line 60 becomes negative and of the parallel or anti-resonant type. As transformed by line 62, the negative resistance appearing across electrodes 34 and 35 is of the series resonant type. That is, when the beam current in oscillator 50 is gradually turned on the resistance loading on the beam by the electrodes of modulator 25a initially is positive, then goes through zero, and finally becomes negative. The amount of negative resistance is adjusted by sliding the taps of line 62 along line 60.

On the other hand, the electron beam in tube 30a creates a positive load across electrodes 34 and 35 which appears at the tap point of line 60 as a positive resistance loading the oscillator and, normally, preventing it from going into oscillation. The taps T, which constitute the output terminals of the external source, are preferably moved to a point at which the adjustment of oscillator 50 is such that it is just below a state of actual oscillation; as a result, deflectors 34 and 35 effectively present a negative resistance load to the electron beam in tube 30a. The orbital radii of electrons in the beam between deflectors 34 and 35, which are subjected to a magnetic field $H_2$ of a strength sufficient to create an electron-resonant frequency equal to that of the signal frequency, are thereby expanded. Magnetic field $H_2$ may be generated by a solenoid encircling deflectors 34 and 35 in the manner described for fields $H_1$ or $H_3$.

A practical form of tube 30a is illustrated in FIGURES 3, 3a and 3b. Tube 30a comprises an evacuated elongated cylindrical envelope 65 in which electron beam source 20 is an electron gun assembly 66 disposed near one end wall 67 and oriented to project an electron beam toward the opposite end wall 68. Electron gun assembly 66 may be entirely conventional and preferably generates a sheet-like electron beam, that is, an electron beam of rectangular configuration. Electron gun assembly 66 includes an elongated cathode 70 disposed transversely of the direction of beam travel and enclosing a conventional heater element which, when energized, causes electrons to be emitted from the usual emission-forming coating on the cathode. A shield 71 surrounds the cathode areas from which emission is undesired. Successively spaced in front of cathode 70 toward tube end 68 are a pair of slotted electrodes 72 and 73 which, when tube 30a is placed in use, are energized in a well known manner to focus and accelerate the electrons from cathode 70 to form the sheet-like beam. Operating potentials are applied to cathode 70 and electrodes 72 and 73 by way of respective connecting leads, generally indicated at 74, passing through the adjacent end 67.

Serving as electron beam collector 22 is an anode 76 disposed transversely of the beam path near the tube end 68. As shown, anode 76 is simply a metal plate and may be fed with a suitable operating potential by way of a connecting lead 77 projecting through the adjacent end 68.

Disposed along a first portion of the beam path just beyond gun assembly 66 are modulator deflector plates 31 and 32 located individually on opposite sides of the beam path and, for the present embodiment which utilizes a sheet beam of rectangular cross-section, parallel to the longer side of the rectangle. Electrical connection to electrodes 31 and 32 is by way of leads 80 and 81, respectively, which are brought out through end wall 67. Just beyond electrodes 31 and 32 toward collector 76 is a slotted-plate electrode 83, serving as an electrostatic shield between the modulator and the expander.

Further along the beam path beyond electrode 83 are modulation-expander deflector electrodes 34 and 35 disposed in alignment with electrodes 31 and 32 and which may be of a construction identical with that of the latter. Electrodes 34 and 35 are bridged by coil 36. Conductors 84 and 85 are connected at one end respectively to electrodes 34 and 35 and project over anode 76 and through the tube end wall 68.

Still further along the beam path and just beyond electrodes 34 and 35 is another slotted electrode 87 which may be identical to electrode 83. For convenience, electrode 87 is electrically connected to electrode 83 by leads 88.

Disposed alongside the beam path between electrode 87 and anode 76 are receptor electrodes 37 and 38 which are aligned with electrodes 31, 32 and 34, 35. Electrodes 37 and 38 are in this instance identical to electrodes 31 and 32 and are electrically connected to leads 90 and 91 which project from the electrodes through tube end wall 68.

The entire mechanical assembly is supported between two insulating sheets 92, of mica or the like, with the different electrodes individually mounted between sheets 92 by means of rods spot-welded to the extremities of the electrodes, the rods having their ends projecting through the respective insulating sheets which are disposed longitudinally of tube 30a. Sheets 92 are in turn supported at the electron-gun end of tube 30a from posts 93 secured in end-wall 67. At the other end of the tube the entire assembly is supported principally by a rigid, multipart strap-like conductor 94 secured through leads 95 to end wall 68. Conductor 94 is wider than the spacing between electrodes 37 and 38 and projects over the upwardly facing edges of the latter from an electrical connection with electrode 87 toward end wall 68 so as to serve as a shield between anode 76 and receptors 37 and 38, on the one hand, and leads 84 and 85 on the other. A potential may be applied to electrodes 83 and 87 by way of conductor 94 and leads 95.

With but a single electron modulation expander as described with respect to FIGURES 2 and 3, the desired electron motion expands linearly. Such expansion can be obtained in geometric progression by including a succession of the expanders as shown in tube 30b illustrated in FIGURE 4. In this figure, modulator 23 and demodulator 26 are identical with those described above. Spaced along the beam path beyond modulator 23 is a first modulation expander 25a identical with that described before and coupled to negative resistance generator 50. To obtain a geometric progression of the expansion, a second modulation expander 25b is spaced along the beam path between the first expander and demodulator 26. Expander 25b may be identical in all respects with the first expander and is similarly coupled to a negative-resistance generator 50b.

When modulation expansion is achieved by the use of an external active device as in FIGURES 2, 3 and 4, noise energy is coupled into the electron stream from that device. While the total noise energy appearing in the load may be substantially reduced by virtue of the interchange in the modulator between noise-energy content and signal content, it is further contemplated in accordance with the present invention to expand the modulation without relying upon an external source of negative resistance. A simple arrangement is illustrated in FIGURES 5a and 5b.

In these figures, tube 30c includes modulator 23 constructed in a manner which may be identical with that described above with respect to FIGURE 2 and which is fed from source 24 through transmission line 40 with signal energy at a desired frequency. Similarly, demodulator 26 may be identical with the construction previously described and is coupled to a load 27 through line 45. Both modulator 23 and demodulator 26 are disposed within a magnetic field which, as previously described, may comprise one continuous solenoid encompassing the entire tube as indicated by the arrow H in FIGURE 5a or a plurality of solenoids individually about each modulator as indicated by arrows $H_1$ and $H_3$ in FIGURE 5b. The strength of the field is in this instance adjusted to establish a resonant frequency of electron motion the same as that of the signal frequency. It should be understood that, using separate solenoids, it may be desirable to employ different field strengths in modulator 23 and demodulator 26 as when different structure is used in the two as discussed hereinafter.

Between modulator 23 and demodulator 26, modulation expander 25c produces an effective negative mechanical resistance directly on the electrons of the beam. In order to obtain gain in the modulation expander, it is of course necessary to supply energy in some form. In accordance with a preferred form of the present invention this energy is supplied in a form which minimizes the transfer to the beam of noise components present in the external source, at least in the modulation mode to which demodulator 26 is responsive. To this end, the stiffness of the electron suspension or the restoring force field within the expander is periodically varied in phase with electron-motion components so as to impart energy to the electron motion. This is achieved by subjecting the electron beam to a time-varying inhomogeneous field during its passage through a modulation expander 25c.

The inhomogeneous field may be created in various ways; as illustrated in FIGURES 5a and 5b it is an electric field developed by a pair of dissimilar-size concentric conductive cylindrical sections or electrodes 97 and 98 disposed on opposite sides of beam path 21, electrode 97 curving toward and electrode 98 curving away from the beam. Section 98 is smaller than section 97 whereupon a potential applied between the two sections develops an inhomogeneous electric field through which the beam path extends. Preferably, the length of the sections is selected so that the transit time of electrons through expander 25c equals an integral multiple of cycles of the signal frequency. Conveniently, the length may be identical with that of the deflectors in the modulator.

Within expander 25c, the beam electrons are subjected to a field of a strength sufficient to establish a restoring force for the selected electron-resonant frequency. A magnetic restoring force field $H_2$ may be supplied by a solenoid encircling the tube. For the illustrated embodiment, it is most convenient to utilize a single solenoid encompassing the entire tube to provide the resonance fields for the modulator and demodulator as well.

Energy from which the resultant amplification is eventually derived is supplied by a driving signal generator or energy source 99 which produces an alternating driving signal having a frequency in this instance different from the signal frequency. Driving signal energy is coupled from its output terminals $t_1$ to electrodes 97 and 98 through a two-mesh coupling network 100a. Electrode 97 is connected to a transmission line 105 through an inductor 106 and a small coupling capacitor 107. Electrode 98 is similarly connected to transmission line 105 through an inductor 108 and a small coupling capacitor 109. An inductor 110 is connected between intermediate taps on inductors 106 and 108, while a capacitor 111 is connected between the ends of inductors 106 and 108 remote from electrodes 97 and 98. Line 105 is coupled to the driving signal generator through a transformer 113. In operation, the electron beam traveling along path 21 is initially modulated with the input signal in modulator 23 as previously explained. In the presently embodied structure, electrons within the beam entering the expander describe a helical path. Within the expander, the electrons in the beam are in this instance driven by an alternating field at a frequency above the electron resonance frequency. As a result, each electron oscillates about its average position in such a phase that at the instant of maximum excursion in one direction it is closest to the field producing electrode which is negative at that instant. In this embodiment wherein the electron follows a helical path and the alternating field frequency is above the cyclotron frequency established by restoring force field $H_2$, at the instant electrode 98 is most negative and electrode 97 is most positive the electron is closest the electrode 98. If the field between electrodes 97 and 98 were homogeneous, forces acting on the electron would average out for each complete cycle. But in the non-homogeneous field utilized in accordance with the present invention, the forces acting upon the electron are stronger at one extreme excursion than at the other. Consequently, the average force acting upon each electron over one complete cycle is unequal to zero. The repelling force from electrode 98, exerted during the time that the electron is closer to that electrode, outweighs the weaker repelling force exerted by electrode 97. As a result, a unilateral force is developed which drives the electron in a direction toward electrode 97.

Because the electrons are found near the more negative electrode whenever the field developed thereby is at a peak value, the cumulative effect of a large number of electrons vibrating in the field is to impede the charging of electrodes 97 and 98 from the external source of alternating potential; this is equivalent to a reduction in the capacity between electrodes 97 and 98. With a homogeneous field, such capacity reduction would be independent of beam position. But with the non-homogeneous field of the invention the capacitance reduction becomes larger whenever the average beam position is nearest to electrode 98. This occurs because the stronger field adjacent that electrode couples the beam more strongly thereto and to the coupling network connected to that electrode.

Thus, because of the existence of the non-homogeneous field through which the electron beam path extends, the application across electrodes 97 and 98 of an alternating potential at a frequency above the cyclotron frequency imposes a uni-lateral transverse force on the beam, while any transverse beam motion causes a change in capacity between electrodes 97 and 98.

In response to the input signal from source 24, the beam entering expander 25c revolves at the signal frequency with a given amplitude. As explained, this beam motion varies the capacity between the expander electrodes at a rate corresponding to the signal frequency. The resulting periodic variation of the capacitive reactance causes a phase modulation of the driving signal current fed to the expander electrodes through network 109a. In a well known manner, the phase-modulated driving signal current may be represented as consisting of the original unmodulated driving signal component and two sideband components at the sum and difference frequencies of the signal and driving frequencies. In the present instance, one of the resonant frequencies of network 109a, is tuned to coincide with this difference frequency. Consequently, the difference frequency component is greatly emphasized while the sum frequency component is minimized and may be neglected.

One of the resonant modes of network 109a is determined by inductor 110 together with capacitor 111 and the average capacitance between electrodes 97 and 98. These elements constitute a circuit parallel resonant at difference frequency $f_2$. At the same time, inductors 106 and 108 together with the average interelectrode capacitance and capacitor 111 preferably form a series resonant circuit at the driving signal frequency $f_3$. The input signal from source 24 has a frequency designated as $f_1$ which in the present case is also the cyclotron frequency established by magnetic field $H_2$.

The voltage appearing across expander 97 and 98 thus consists primarily of two components, at the original driving frequency $f_3$ and the difference frequency $f_2$. With the signal motion of the beam corresponding to a signal weak compared to the driving signal, the difference frequency component is also weak compared to the driving frequency component and it becomes permissible to represent the sum of the two components as a driving frequency signal, amplitude-modulated as well as phase modulated by the signal frequency $f_1$.

An analysis of the phase relations encountered in the expander reveals that the driving frequency component and the difference frequency component are in additive phase relation during the time when the electrons in the beam move from electrode 98 toward electrode 97. Similarly, the driving and difference frequency components are in subtractive phase relation when the electrons in the beam move in the opposite sense. As a result, the unilateral force from electrode 98 repelling the electron beam is stronger when the beam is moving away from that electrode than when the beam electrons are moving toward that electrode. Consequently, the revolving motion of the electron beam at the signal frequency is enhanced and the additional amplitude of electron motion detected by the demodulator represents an amplified signal.

To further understand the principles involved, it may be helpful to examine the operation from a slightly different standpoint. Under the influence of the driving frequency field developed by electrodes 97 and 98, electrons in the beam are forced to vibrate at the driving frequency with an amplitude proportional to the driving field. That is, the beam electrons which are already moving along a path with a motion representing the input signal modulation are caused to vibrate about that signal-motion path. Because the driving frequency field is non-homogeneous and is therefore stronger near electrode 98, the vibration of the beam at the driving frequency is of larger amplitude when the beam is nearer electrode 98 than when it is nearer electrode 97. In the present instance where the beam enters the expander with a transverse motion at the signal frequency, this motion brings the electrons alternately closer to electrode 98 and then to electrode 97. Because of the stronger driving field near electrode 98, the vibration of the beam at the driving frequency becomes amplitude modulated with the signal frequency.

A transversely moving electron beam may be considered as representing a current flowing across the expander, in this instance between electrodes 97 and 98. This current contains all components of the electron motion. Since the electron motion at the driving frequency is amplitude modulated with the signal frequency, this motion contains sidebands at the sum and difference frequencies. The electron motion component at the difference frequency induces a voltage in network 109a which is resonant at that difference frequency.

As stated above, the appearance of this voltage in the circuit results in amplitude modulation of the driving frequency voltage and the development of a force which enhances the transverse motion of the beam at the signal frequency. It should be particularly noted that the component of the electron motion at the difference frequency $f_2$ will exist even if the circuit is not tuned to that frequency. This factor is of special significance in a specific implementation of the invention in which the driving signal frequency is equal to twice the signal frequency.

In this special case, amplitude modulation of the driving signal by the input signal results in a difference frequency which is equal to the signal frequency. As just explained, the difference frequency actually exists as a component of electron motion. Because the restoring force field $H_2$ provides effectively a resonant suspension at the signal frequency, electron resonance also occurs for the electron motion component at the difference frequency. With these two frequencies the same, the two motions become indistinguishable.

Dependent on the phase relationship between the driving frequency component and the signal frequency component, the difference frequency may be in phase or out of phase with the signal motion. When the difference frequency component is in phase, the signal motion of the electron beam is enhanced. When out of phase, the signal motion is reduced. A detailed mathematical analysis of the resulting electron motions reveals that an exponential increase or decrease of the orbital radius occurs in the two cases.

While it may appear that to obtain useful amplification the driving frequency would need to be exactly equal to twice the signal frequency and of correct phase, it has been found that useful amplification can be obtained even though there is considerable variation from these requirements. This will be understood by noting that the driving frequency when not accurately equal to twice the signal frequency will be alternately correctly and incorrectly phased with respect to the signal motion. As a result, the orbital radius of the electron beam goes through periods of exponential growth alternating with periods of exponential decay. The time average of the orbital radii, after traversing the expander, is always larger than the radius at entry to the expander because the exponential growth outweighs the exponential decay.

In the special case mentioned for which the driving frequency approximates twice the signal frequency, an external circuit resonant at the difference frequency is not required, that function being assumed by the electron beam itself which is capable of resonant motion in the restoring force field. Thus, gain may be obtained in the expander by driving electrodes 97 and 98 at any frequency. It is only when the driving frequency departs too far from twice the signal frequency, so that the electron resonance of the beam can no longer be relied on for support of the difference frequency, that an external tuned circuit such as coupling network 100a, resonant to the difference frequency, should be provided.

For a driving signal frequency approximately twice the signal frequency, the coupling network may be simplified. For example, coupling network 100b illustrated in FIGURE 5c may be substituted, between the terminals X—X and driving signal generator 99 in FIGURE 5b, for network 100a. Network 100b includes an inductor 114 coupled across electrodes 97 and 98. Driving signal generator 99, in this case providing a signal of a frequency approximately twice that of the input signal, is coupled to inductor 114 by a transmission line 115 tapped across an intermediate portion of the inductor to properly match the impedance of the generator to that presented by the expander electrodes. Inductor 114 has a value of inductance to form with the average capacitance between electrodes 97 and 98 a parallel resonant circuit tuned to the driving signal frequency.

A preferred embodiment of the present invention is illustrated in FIGURES 6a and 6b. Like FIGURE 5b, only the input and output modulators and the expander of tube 30d are shown in FIGURE 6b for purposes of clarity. In this instance, modulators 23 and 26 of tube 30d are essentially identical to those described with respect to the tube 30c in FIGURE 5a. To facilitate matching, coils 96a and 96b are connected across the deflector pairs of modulators 23 and 26, respectively. Coils 96a and 96b have an inductance value which together with the inter-deflector capacity tunes the resultant parallel-resonant circuits to the signal frequency.

In the apparatus of FIGURES 6a and 6b, the inhomogeneous electric field is developed in expander 25d by the application of opposite potentials to alternate conductors 103 disposed parallel to the beam and lying in a plane along one side thereof. On the side of the beam opposite conductors 103 is a plate electrode 104. The overall length of conductors 103 and electrode 104 is such that several cycles of beam modulation occur during passage of a given electron therebetween. Preferably, the length is selected so that the transit time of electrons through the expander corresponds to an integral multiple of cycles of the signal frequency. As illustrated, the length and width of the conductor array and of the electrode may be identical with the dimensions of the deflectors in the modulator. The space between conductors 103 and electrode 104 through which the electron beam passes is subjected to a magnetic field, as indicated by arrow $H_2$, of a strength establishing the desired electron resonant frequency.

As in the apparatus illustrated in FIGURE 5b, driving signal energy is fed to the expander from a driving signal generator 99a. In this instance, network 100c is coupled across conductors 103. The elements which constitute network 100c are connected in the manner described with respect to network 100a and are designated in FIGURE 6b by corresponding numbers having the postscript "a" added. Thus, inductor 110a together with capacitor 111a and the inter-conductor capacitance constitute a circuit resonant at the difference frequency $f_2$. Inductors 106a and 108a together with the inter-conductor capacitance and capacitor 111a form a series resonant circuit at the driving signal frequency $f_3$.

The operation of the apparatus illustrated in FIGURES 6a and 6b follows the explanation given above with respect to FIGURES 5a and 5b. In this instance, the non-homogeneous field is produced between the alternately energized ones of conductors 103, the field fringing outwardly across beam path 21. In addition to the action previously described, the field developed by conductors 103 also develops a net repelling force on the electron beam. To counteract this effect and maintain the beam centered between conductors 103 and electrode 104, a unidirectional potential from a source B— may be applied to electrode 104.

In the manner previously explained, the component of electron motion at the difference frequency induces a voltage in the external circuit, which voltage amplitude modulates the driving voltage with the result that a force is developed which enhances the transverse motion of the beam at the signal frequency. With input modulator elements of the type illustrated, the orbital motion given to the electron beam is thus subjected in the expander to an increase of the orbital radius. It should be understood that the principle of operation utilized in the apparatus of FIGURES 6a and 6b is entirely the same as that of the apparatus shown in FIGURES 5 and 5b. The only essential difference is the manner in which the non-homogeneous field is developed; that is, the difference lies essentially only in the particular expander electrode structure employed.

Also as previously explained, it is not necessary that the external circuit be resonant for the difference frequency, since that function may be assumed by the electron beam itself. Accordingly, coupling network 100d illustrated in FIGURE 7 may be substituted for coupling network 100c in FIGURE 6b. Network 100d includes inductor 114a and transmission line 115a arranged as explained with respect to FIGURE 5c. Again, it is only necessary to provide an external tuned circuit for the difference frequency when the driving frequency is sufficiently different from twice the signal frequency that the electron resonance can no longer be relied on for supporting the difference frequency.

Other beam interaction devices may be utilized for the input and output sections as well as for the expander. It is contemplated to make changes in the structure based on relationships between signal frequency, electron resonant frequency, and phase velocity as explained in detail in the aforementioned article. The condition of operation wherein the electron resonant frequency equals the input signal frequency is characterized by infinite phase velocity of the fast wave. However, when the signal frequency is higher than the electron resonant frequency, the fast electron wave is directed forward and travels at finite velocity although faster than the stream. On the other hand, when the electron resonant frequency is higher than the signal frequency, the fast electron wave travels backward. Lumped structures, such as the deflectors and receptors described above, apply a signal simultaneously throughout a finite length and accordingly are most suitable for the condition of infinite phase velocity. Transmission line structures on the other hand may be designed for any finite phase velocity, forward or backward. Energy interchange between signal and noise occurs between the wave on the transmission line and the fast electron wave as described in the introduction; after a certain length of travel along the line, the interchange is complete. A transmission line coupler, such as is illustrated in FIGURE 8, of this length is therefore suitable for use in either the modulator or demodulator under conditions wherein the signal frequency and electron resonant frequency are unequal. The construction shown in FIGURE 8 of a modulator 23′ includes helical transmission lines disposed on opposing sides of the beam path. Two sheets of insulating material 117 are disposed individually on opposite sides of the beam path with each sheet 117 carrying a helical winding 118.

In operation, signal source 24 or load 27, respectively, may be connected to the two windings 118 at one end of the structure. At the other end, the windings may be electrically terminated by a resistance equal to their characteristic impedance; it has been found, however, that this termination is not critical.

With regard to the expander, the external tuned circuit embodiments illustrated work best under the condition of infinite phase velocity. While the expander may be designed for interaction at finite phase velocities, the construction is somewhat more complex. For this reason, it is also contemplated to utilize different magnetic fields in the modulator, demodulator, and expander, enabling the use of combinations of finite and infinite phase velocity interaction devices. For example, the signal frequency may be made to equal the cyclotron frequency in an infinite phase velocity expander but not in the modulator and demodulator which may utilize finite phase velocity devices.

An expander of the simpler version in which the driving signal frequency is approximately twice the electron resonant frequency and with which no additional tuned circuit is employed does not require the condition of infinite phase velocity, because in this type of expander each electron is treated separately so that the phase velocity, which is a property of the pattern of the electron beam, is irrelevant. Accordingly, a most useful combination of the various apparatus described above comprises a modulator and demodulator both operating with finite phase velocity, together with an expander of the simple deflector electrode type. It is therefore contemplated to use expander 25c of FIGURE 5b with the helical transmission line coupler of FIGURE 8 serving as the modulator and a like transmission line coupler serving as the demodulator. The magnetic field for this arrangement is uniform for all three sections and the driving signal is approximately twice the cyclotron frequency established thereby. In this device, the cyclotron frequency may be either substantially smaller or substantially larger than the signal frequency. The two cases represent utility at high or low frequencies, respectively.

If the expander is designed for finite phase velocity, the optimum driving signal frequency is no longer equal to twice the electron-resonant frequency. A different driving signal frequency exists at which the moving electrons "see" a driving-signal field at twice the electron-resonant frequency. To determine the proper frequency to be applied to the finite-phase-velocity expander, the Doppler effect caused by the relative motion of the electrons and the wave along the expander is taken into account so that the number of inhomogeneous-field reversals encountered by an electron is approximately four during one electron-resonance period.

It might also be noted that where the elimination of noise is of no concern, simple gaps such as lumped deflectors very short in the direction of electron travel may be used for the modulator and demodulator. On the other hand, it is known to discriminate between the slow and fast wave by using pairs of such gaps spaced and phased with respect to the electron motion so that the undesired wave is cancelled. Thus modulators and demodulators embodying such combinations of gaps may be used to obtain the full advantages of the invention.

On the other hand, it should be noted that the expanders are not limited in utility to employment with modulators and/or demodulators having special low-noise characteristics. To the contrary, the preferred expanders find advantageous use irrespective of the kinds of modulator and demodulator employed, and amplification of electron motion is obtainable in the expander with either fast or slow electron-wave interaction. All of these preferred expanders are parametric amplifiers; in each case one or more parameters are varied periodically and in the final analysis the parameter which is varied is one acting directly on the beam to produce a restoring force, although other parameters, such as a capacitance, may be varied simultaneously to effect the operation. The greatest benefits will usually be obtained through the use of fast-wave interaction throughout with each section of the amplifier constructed to take fullest advantage of the noise elimination capabilities of the invention principles.

A practical construction of the preferred embodiment of the present invention is pictorially shown in FIGURES 9, 10 and 11. As constructed in a practical form, tube 30d is essentially identical to tube 30a, FIGURE 3, except for the intermediate section comprising the modulation expander. As before, the assembly is included within an evacuated envelope 65 having end walls 67 and 68. Near end wall 68 is the electron gun 66a composed of cathode 70, a shield 71a, and focusing and accelerating electrodes 72 and 73. First along the beam path beyond the electron gun are deflectors 31 and 32 of the input modulator. Suitable electrical connections to these elements, indicated at 74, project through end wall 68. One difference, of only a practical nature, between the modulator and demodulator sections in tubes 30a and 30d lies in the inclusion in the latter of a small coil 96a connected across deflectors 31 and 32. Coil 96a together with the inter-deflector capacitance serves to tune the deflectors to the input-signal frequency, facilitating impedance matching.

The expander assembly is disposed between apertured electrodes 83 and 87 in the same relative position as expander 25a in tube 30a. Electrode 87 is electrically tied to electrode 83 by a lead 88. Beyond electrode 87 are receptors 37 and 38 of the demodulator which in turn are followed by collector 76. The latter is supplied with an operating potential by way of lead 77 and receptors 37 and 38 are connected to leads 91. As in the modulator, a coil 96b is connnected across receptors 37 and 38 to facilitate matching the deflectors to the load.

The entire assembly is supported between insulator-sheets 92 secured at the one end to support rods 93 and principally supported at the other end by strap conductor 94, the latter also serving as part of the externally available connection to electrode 87 and serving as a shield between the output elements and driving-signal input leads 120. As so far described, the structure essentially corresponds to that of tube 30a and hence the same numbers have been used for the most part to indicate like elements.

The expander section of tube 30d includes an array of conductive elements 103 disposed parallel to the electron beam path and on one side thereof. Each one of conductors 103 is welded at one end to the side of one of a pair of rods 121 secured between sheets 92. From top to bottom conductors 103 are alternately secured to different ones of the pair of rods 121. Each conductor 103 projects toward beam path 121 from its support rod for a short distance and is then bent in a direction generally toward the other support rod to lie alongside beam path 21.

Electrode 104 is a conductive plate parallel to the plane in which conductors 103 lie and located on the side of beam path 21 opposite conductors 103. Suitable connecting leads are attached to conductors 103 and electrode 104 and brought out through envelope 65 for connection to an external coupling network such as networks 100a or 100b shown in FIGURES 6b and 7. Such connecting leads enable operation of tube 30 as described with respect to FIGURES 6a and 6b.

In order to simplify the attainment of a proper impedance match between conductors 103 and the external driving-signal generator, it is preferred to form the elements of the coupling network inside the tube immediately adjacent conductors 103 and electrode 104. As shown, coupling network 100c is physically embodied as part of the tube structure.

To form a shielded compartment for the structure serving as capacitors 107a, 109a and 111a, one end of electrode 104 projects away from beam path 21 and then is bent to lie in a direction parallel to its active portion so as to form a generally rectangular enclosure open only on the side away from the electron gun. Centrally disposed within this enclosure are a pair of plate electrodes 123 and 124 secured between sheets 92 and parallel to one another. On each side of the pair of electrodes 123 and 124 are disposed one of rod pairs 125 and 126, each pair of rods being spaced a short distance from the adjacent ones of electrodes 123 and 124. Driving-signal input leads 120 are coupled individually to rod pairs 125 and 126.

Disposed beneath the lower sheet 92 near the bottom of the array of conductors 103 are a pair of coils which constitute inductors 106a and 108a. One end of coil 106a is connected to one of rods 121. Similarly, one end of coil 108a is connected to the other of rods 121. The opposite ends of coils 106a and 108a are connected individually to electrodes 123 and 124, respectively. Finally, a coil which constitutes inductor 110a is supported between sheets 92 on the side of conductors 103 away from beam path 21. The opposite ends of coil 110a are individually connected to the corresponding midpoints of coils 106a and 108a.

Referring to the schematic diagram of coupling network 100c shown in FIGURE 6b, driving signal input leads 120 constitute a portion of transmission line 105a. Capacitor 107a is formed by rod-pair 125 and electrode 123. Rod-pair 126 and electrode 124 form capacitor 109a. The two capacitors so formed are connected individually to one end of coils 106a and 108a the other end of each of which is coupled individually to one of the sets of conductors 103. Coil 110a is tapped between intermediate points of coils 106a and 108a. Finally, electrodes 123 and 124 form capacitor 111a connected across the ends of coils 106a and 108a which are also connected to capacitors 107a and 109a; thus, each of electrodes 123 and 124 forms a part of two different capacitors.

With the exception of transformer 113a and driving signal generator 99a, the entire structure illustrated in FIGURE 6b is thus incorporated within the envelope. Of course there are numerous ways in which the assembly could be mounted. The construction illustrated is advantageous because of the comparative simplicity of the parts utilized as described with regard to FIGURES 6a and 6b, during operation the entire tube is inserted within one or more solenoids.

It has been mentioned that electrons in the beam are subjected to a restoring force field and that in accordance with the preferred embodiment of the invention the stiffness of this field is varied periodically with respect to time at a rate correlated with the signal motion of the electrons to impart additional energy to the signal motion. In the examples described, this has been accomplished by passing the signal modulated beam through structure which creates an inhomogeneous field. An examination of the effect of such a field serves to illustrate perhaps more clearly the nature of the action involved in the devices discussed and also serves to illustrate the wide variety of other structures which may be employed to increase the signal energy in accordance with the inventive principles.

A fundamentally simple structure for producing an inhomogeneous field is illustrated in FIGURE 12 and comprises electrodes 140 and 141. The shape of electrode 140 is that of a section of a cylinder, its concave surface facing electrode 141 which is a rod disposed parallel to the axis of electrode 140.

When a potential is placed across electrodes 140 and 141, an electric field is developed between the two electrodes as indicated by dashed lines 142; lines 142 fan out from electrode 141 toward electrode 140. It will be observed that this field has the same general shape as that produced by the structure described and illustrated above with respect to FIGURES 5a and 5b.

In those embodiments of the invention wherein an external circuit tuned to the difference frequency $f_2$ is not used, as when network 100b of FIGURE 5c is employed, the method of parametric amplification is primarily concerned with the development of properly phased forces upon individual electrons of the beam as contrasted with what may be considered an action on the beam as a whole; of course, all electrons in the beam are subjected to certain of the described effects but analysis proves that effects properly phased to impart increased signal motion produce exponential gain while effects phased to decrease signal motion produce exponential attenuation. The net result as applied to all the electrons in the beam is one of increased motion and thus of amplification. Because we are then most interested in the effects on a properly phased individual electron, assume the existence of a single electron, indicated at 144 in FIGURE 12, disposed centrally between electrodes 140 and 141.

The forces developed on electron 144 by the inhomogeneous field may conveniently be represented by considering the field as the sum of a homogeneous field and an inhomogeneous field as viewed from an arbitrary reference point. The reference point in this instance is the indicated position of electron 144. For convenience, a line drawn between the centers of electrodes 140, 141 is termed the X axis and the effects first considered are those of moving electron 144 back and forth along that axis across a vertical Y axis through the reference position.

The field at the reference position represents a homogeneous field of a given intensity. The field to either side of the reference position along the X axis consists of the sum of this homogeneous field and a field which is the difference between that homogeneous field and the actual field developed between electrodes 140, 141.

As to the inhomogeneous component of the actual field, and assuming a positive polarity on electrode 140 and a negative polarity on electrode 141, as the electron moves toward electrode 141 it sees an inhomogeneous field component which, being the difference between the homogeneous field component and an increasingly concentrated actual field, develops a force of increasing magnitude and in a direction opposing the electron motion. This is depicted in FIGURE 13 in which electron 144 is indicative of the reference position; the arrows along the X axis have a length representing the magnitude of the inhomogeneous field component and their arrowheads indicate the direction of the force developed thereby. Thus, as electron 144 moves to the right from the reference position, it encounters a force opposing its motion and of increasing strength away from the reference position.

On the other hand, as the electron moves in the opposite direction from the reference position toward electrode 140 the actual field becomes weaker than the homogeneous component of that field and hence the inhomogeneous component, which is the difference between the two, constitutes a force acting in a direction toward electrode 141 and opposite the general direction of the actual field. Moreover, this inhomogeneous field component becomes larger in magnitude as the electron moves further away from the reference position. Hence, in FIGURE 13 the arrows along the X axis to the left of the reference position again point toward the reference position and are of increasing length in the direction away from the reference position.

It will now be seen that when an electron enters the actual field of FIGURE 12 between electrodes 140, 141 with a motion back and forth along the X axis or center position about which the electron reciprocates, the inhomogeneous component of the actual field develops forces which oppose the electron motion as it moves outwardly of the reference position and aid its motion as it moves inwardly toward the reference position.

FIGURES 14 and 15 illustrate the effects produced when the polarities on the electrodes are reversed so that electrode 141 is now positive with respect to electrode 140. Consequently, the actual forces acting on electron 144 are indicated by arrows pointing in the opposite direction, toward electrode 141, on the fan-shaped dashed lines between the two electrodes. Under these conditions, as the electron moves toward electrode 141 the strength of the inhomogeneous field component of the actual field again increases in magnitude as the electron moves away from the reference position but the direction of the inhomogeneous field component force is now toward electrode 141. Similarly, as the electron moves toward electrode 140, the inhomogeneous field component forces increase in magnitude and are in a direction away from the reference position. Hence, the arrowheads on the force vectors in FIGURE 15 are in a direction opposite those of FIGURE 13. Consequently, an electron entering the field indicated in FIGURE 14 with a given motion along the X axis about the reference position is given energy as it moves outwardly but gives up energy as it moves inwardly.

In the preferred embodiments of the present invention, the electron motion is increased by "pumping-up" the energy in the electron motion. With respect to electron motion appearing along the X axis, it may be helpful to examine a simple analogy. FIGURE 16 illustrates a pendulum having a ball 150 suspended by a string 151 from a hook 152. When swinging, the pendulum describes an arc indicated by dashed lines 153. When the pendulum is subjected to a force opposing its motion, the length of arc 153 decreases. On the other hand, when it is given a push in the direction of its motion at some point thereof, the length of arc 153 increases.

Referring now to FIGURE 17, a collar 154 is slidable along string 151 and is movable only in a vertical direction. With ball 150 swinging back and forth, when the collar is moved downwardly away from hook 152 at the time ball 150 reaches its peak the ball follows a steeper path on its descent from the peak and thus gains energy; this energy is derived from the work done in forcing the collar vertically downward. When thereafter the collar is returned to its original position at the time ball 150 moves through the mid-point of arc 153, no energy is removed from the system since the string, being straight at this instant, does not resist such movement. As a net result, increased energy is given to the ball and its motion increases. Dashed lines 155 indicate the path taken by the ball through one cycle of such motion.

Returning now to FIGURES 12 and 13 taken together with FIGURES 14 and 15, by properly switching between the conditions of FIGURE 12 and the conditions of FIGURE 14 the motion of the electron may be increased. As the electron is moving outward to the left of the reference position, the polarities of electrodes 140 and 141 are as indicated in FIGURE 14 so that the inhomogeneous-field-component vectors of FIGURE 15 act on the electron. As the electron moves back toward the origin, the polarities on the electrodes are reversed so that an inwardly directed force is exerted upon the electron as illustrated in FIGURE 13. When the electron then passes through the reference position on to the right side of the reference position, the polarities are again switched to that illustrated in FIGURE 14 so that the force vectors of FIGURE 15 apply. Again, as the electron reaches its peak the polarities are once again switched so that the force vectors of FIGURE 13 apply as it moves back toward the reference position. Thus, periodically switching the potentials on electrodes 140 and 141 subjects the electron in all phases of its movement to an inhomogeneous-field-component force which tends to aid the motion and thus increase the velocity thereof. With respect to the forces along the X axis, energy is delivered to the electron motion at the excursion extremes since work is required to switch the finite inhomogeneous component field strength at those positions. But no work is returned by switching polarity of the inhomogeneous X axis component at the reference position since that component is then zero. Hence, a net gain in motion energy is achieved like in the pendulum analogy.

It will be observed that, as to the individual electron, the alternation of the polarities on electrodes 140 and 141 must be at twice the frequency of the initial electron motion in order to direct the inhomogeneous field component forces properly to expand the electron motion during all portions of the motion. The number of inhomogeneous field reversals encountered by an electron is therefore four during one electron-resonance period. While the reversal of electrode polarity as described occurs at the second harmonic of the initial individual electron motion, as previously mentioned it is not necessary that the reversal be timed so as to occur exactly at twice the signal frequency represented in the beam modulation. Those electrons having signal motion properly phases so as to receive additional energy to increase the motion do so in accordance with an exponential law of growth, while those electrons which are subjected to attenuation of their motion by reason of being out of phase with the alternation are subjected to decreased motion also following an exponential relationship; since the net result of this exponential growth and attenuation is one of amplification as long as a sufficient portion of the beam electrons are properly phased, an electron beam subjected to an alternating field as described yields net amplification for beam modulations having a wide range of frequencies.

Thus far, this portion of the explanation has been restricted to consideration of electron motion along only the X axis whereas the particular embodiments of the invention previously described in detail all involve modulation of the electron beam in a way such that the electrons in the beam describe helical paths as they enter the expander. Electron motion in a circular direction is in no way a limiting qualification upon the modes of electron motion to which the principles of the present invention are applicable. For example, in FIGURE 18 there is schematically illustrated a periodic electrostatic focusing device in which a signal-modulated beam of electrons is projected generally along a reference path 160. Spaced along that path in the direction of electron travel and on either side of the path are a first succession of electrode pairs 161. Also spaced along the path in individually intervening spaces between electrode pairs 161 are a second set of electrodes 162. The two sets of electrode pairs are individually coupled in parallel across opposite sides of a transmission line or pair of conductors 163. Transmission line 163 is fed from a source of driving signal energy 164 coupled in series with a D.C. potential source 165. One side of transmission line 163 is coupled to positive terminal of a D.C. source 166 the negative terminal of which is connected to ground.

The direct-current potential applied to electrodes 161, 162 from source 165 develops a periodic focusing or restoring force field which confines the electron stream and establishes a transverse resonant frequency $f_e$. Superimposed upon the direct-current focusing voltage from source 165 is an alternating-current potential from source 164 at a frequency $f_s$. In general, the superimposed alternating-current potential varies the quasielasticity of the D.C. focusing field, the variation occurring at the frequency $f_3$. This restoring force, or perhaps more accurately its ratio to the transverse electron excursion which is the transverse electron stiffness, is the parameter varied by the driving signal energy.

For the simpler case wherein the driving signal frequency $f_3$ is twice the electron resonant frequency $f_e$, the transverse motion of the beam either grows or decays depending upon the phase of that motion upon entrance to the system; if the driving signal is not synchronous with the electron resonant frequency $f_e$, the electron motion is amplified in a manner similar to that explained with respect to electrodes 140 and 141.

When the driving signal frequency is substantially different from the electron resonant frequency, the driving signal phase-modulates the transverse electron motion, as a result of which the motion contains a component at the difference or idler frequency $f_3 - f_e$. This component appears out of phase on the two sides of the beam. If an external circuit similar to network 100a tuned to this difference frequency is inserted between source 164 and electrodes 161, 162, coupling D.C. source 165 separately, difference-frequency voltages are produced in the electrodes in opposite phase on the two sides of the beam. These voltages combine with the equally phased driving-signal voltage at $f_3$ to produce two out-of-phase modulated voltages. The repelling forces produced in the structure on each side of the beam are as a result no longer equal but contain a component at the signal frequency $f_1$ which in this case equals the electron resonant frequency $f_e$. It may be noted that in this device there is no homogeneous field component present at the driving signal frequency. This description is somewhat simplified but points out the essential considerations. It serves to illustrate the type of device utilizing only electrostatic fields and in which the electron motion is only along one reference axis as contrasted with the circular motion of other embodiments.

Electron beams in which the individual electrons describe circular patterns are of particular interest in many respects. It is therefore appropriate to consider the forces acting upon the electron in directions other than along the X axis. Referring once again to FIGURE 12, and particularly to reference axis Y at right angles to the X axis with the assumed reference position of electron 144 coinciding with the center of electron motion, the resultant force vectors acting upon the electrons in this instance entering the field between electrodes 140 and 141 with a circular or helical motion are indicated in FIGURE 19 by a diagram analogous to that in FIGURE 13.

Since the angle that force-lines 142 make with reference axis X increases in a direction away from the origin along the Y axis, it necessarily follows that a force component along the Y direction appears which increases as the electron moves further away from the reference position. The increase in magnitude of the inhomogeneous-field-component forces in a direction along the Y axis away from the reference position is indicated by the progressively increased length of the force vectors in FIGURE 19. For the polarities applied to electrodes 140 and 141 in FIGURE 12, the vectors in FIGURE 19 have arrowheads pointing away from electron 144, depicted at the reference position.

Similarly, electrons subjected to the opposite field indicated in FIGURE 14 are subjected to an inhomogeneous component in the Y direction of increasing magnitude as they move away from the reference position, but in this case the direction of the force is toward the reference position as indicated in FIGURE 20.

Turning now to FIGURE 21, the combined forces illustrated in FIGURES 13 and 19 may be considered. Electron 144 entering the actual field between the electrodes with a circular motion describes a circular path 146 in a clockwise direction. At the instant illustrated, the outwardly directed forces along the Y axis act together with the inwardly directed forces along the X axis to produce force in a direction approximately tangential to the electron orbit and of a polarity so as to accelerate the electron motion. One quarter of the orbital period later, the electron passes point 144'; this point is located on a slightly larger circle 146' because of the acceleration given the electron during the preceding quarter orbit. Meanwhile, the direction of the non-homogeneous driving signal field and hence the direction of the forces along the two axes has reversed, so that the electron is again subjected to an accelerating force. Expressed differently, the orbital motion may be projected upon the two axes X and Y; along each axis, it corresponds to a simple periodic motion, the two components being, of course, in phase quadrature. Each of these periodic motional components is aided by an appropriately phased time-varying restoring force field. Because the required rate of time variation corresponds to twice the rate of the periodic electron motion, the two components of the restoring force field are required to have a phase shift with respect to each other not of 90 but of 180 degrees. This out-of-phase variation of the two components is automatically provided by the fundamental properties of a non-homogeneous field which are illustrated in FIGURE 21.

Amplification thus is obtainable either with electrons having a motion in one direction only, as along the X axis, or with electron motion describing a helical or circular pattern. The effect of forces directed along the Y axis is to increase the net energy in the electron motion for the helical beams described, the force vectors in the Y direction changing periodically to increase the motion of properly phased electrons in the same manner as in the X direction.

Because any inhomogeneous actual field may be analyzed with respect to its components of a homogeneous and an inhomogeneous nature taken from an arbitrary reference point such as the center of electron motion, the the same principles are applicable to all of the embodiments in which the stiffness is also periodically varied by timed alternation of the inhomogenous field developed. When a magnetic field is employed in connection with an external difference-frequency circuit, the electron motion may be resolved into two orthogonal coordinates, and the behavior with respect to each of these is fully analogous to the mehcanism explained in connection with FIGURE 18.

It has been shown that the mechanism utilized for periodically varying the restoring force may take different forms. From the explanation just given it will be appreciated that the driving signal applied to the expander electrodes to develop the periodic inhomogeneous field may come directly from a driving signal generator as described previously with respect to FIGURES 5c or 7. Alternatively, the periodic stiffness variation may be produced somewhat more indirectly as by utilizing coupling networks 100 or 100c, wherein the coupling circuitry is resonant at an idler frequency $f_2$ which is the frequency of a sideband component produced by effective modulation of the driving signal by the input signal; this approach yields greater versatility in the selection of the driving signal frequency relative to the signal frequency. In this instance where a parameter of the circuitry is varied there is in turn a resultant variation in the stiffness of the electron beam suspension. Thus, although other parameters may be varied in carrying out the method, an essential parameter which in all cases is varied is the stiffness of the electron suspension.

In the preferred forms of the present invention, there is provided a periodically variable inhomogeneous field component together with a field establishing electron resonance. In the embodiments the structure of which was previously discussed in detail, a homogeneous magnetic field $H_2$ was employed within the expander section. Both fields may be electric as in FIGURE 18. The most practical arrangement at present for transverse field devices appears to be the use of a homogeneous magnetic field of a strength correlated with electron resonance at the signal frequency together with an electric field having an inhomogeneous component which may be added and subtracted to the homogeneous field with proper phases relative to beam motion. Of course, use of a magnetic field restricts operation of transverse electron motion devices to those employing a beam having a generally circular electron movement pattern since the electron resonance established by a magnetic field is that of the cyclotron relationship. In longitudinal field devices where parametric amplification of movement along a single axis is of prime importance, both expander fields preferably are of an electric nature; the space charge or plasma fields establish the electron resonant frequency.

The parametric amplifiers of the invention resemble frequency converters in many respects. The driving signal at frequency $f_3$ may be thought of as the local oscillator frequency. In these amplifiers, an input signal at frequency $f_1$ appears in the output not only at its own frequency but also at the idler or difference frequency $f_2$. At the same time, if there is an input signal at the idler frequency $f_2$ it will also appear in the output at the signal frequency. In fact, there may be no way of determining at the output whether the original input signal was of frequency $f_1$ or $f_2$.

With the desired signal at frequency $f_1$ and observing the output signal at that frequency, electron beam noise at the idler frequency $f_2$ is converted to frequency $f_1$ and appears in the output at that frequency. Preferably, the driving signal frequency is approximately twice the desired input signal frequency so that the latter and the idler frequency are close together, as a result of which a single fast-wave-interaction device serves to remove noise from the beam at both the desired and the idler frequencies. In other arrangement wherein the driving signal frequency is substantially different from twice the desired signal frequency so that the idler frequency differs substantially from the desired signal frequency, so long as the idler frequency corresponds to fast electron wave modulation on the beam the noise content may be removed therefrom by an appropriate coupler. Such a coupler for the idler frequency may either be completely separate from the input signal modulator or, alternatively, the latter may be equipped with an additional mesh so that the modulator is also resonant at the idler frequency.

Analysis reveals that the idler frequency corresponds to fast-electron-wave modulation whenever the driving signal frequency is above the input signal frequency. When the driving signal frequency is lower than the input signal frequency, the idler frequency corresponds to a slow-electron-wave and noise absorption is not achieved. However, when extremely low noise is unnecessary, the process of parametric amplification finds utility in an amplifier in which the signal being amplified is substantially higher than that of the available driving-signal source. For example, a conventional one-thousand megacycle oscillator in use as a driving-signal source enables parametric amplification of an input signal having a frequency of two-thousand megacycles or even higher.

An interesting aspect of this parametric frequency conversion process is that levels of signal or noise energy are changed in proportion to frequency when converted from idler to signal frequency or vice versa. Thus, when the driving signal frequency is sufficiently high that the idler frequency is substantially higher than the signal frequency, noise at the idler frequency is attenuated sufficiently by the conversion process that it may in some instances be ignored. On the other hand, when the driving frequency is only slightly higher than the signal frequency, the idler frequency noise is effectively amplified in its conversion to the signal frequency. Accordingly, a relatively low frequency signal, in this instance applied to an input coupler designed to interact at the idler, frequency, is substantially amplified; this amplification occurs in addition to the parametric amplification of signals at both the idler and signal frequencies.

There have been disclosed several versions of practically obtainable apparatus capable of producing and which have produced a worthwhile gain. Such devices have been found to be particularly useful at ultra-high frequencies and above. In certain embodiments, an external active device supplies power to an electron beam tube at the signal frequency for developing gain of a signal imposed upon an electron beam. These embodiments, while subject to the development of additional noise energy derived from the external active device may be constructed so that noise energy contained in the beam is eliminated prior to signal amplification. Other forms of the inventive apparatus are particularly advantageous because of the substantial absence of noise originating in the external energy source, from which gain is derived, coupled into the beam at frequencies to which the apparatus responds. Consequently, amplified signals may be produced containing a minimum of noise energy.

In all cases, amplification is developed by the production of a negative resistance to which the beam is subjected. In the embodiments first described, this negative resistance is developed by an external device and imposed upon the beam. In the preferred embodiments of the invention, the negative resistance is developed by and on the beam itself.

A significant feature of the apparatus lies in its high bandwidth capabilities. In certain forms, of the apparatus, such as those described with lumped electrodes in the modulator and demodulator, the principal limitations on bandwidth, although not severe, exist in the modulator and demodulator structures. In other forms, such as those employing transmission line couplers in the modulator and demodulator sections, the bandwidth may be substantially increased. The various forms of the modulation expander discussed are capable of extremely wide-frequency-range operation.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. In an amplifier in which an electron beam transversely modulated with intelligence signals is projected along a predetermined path, a modulation expander comprising: means for establishing transverse-resonant periodic electron motion; and means for subjecting said electrons to a transverse periodic inhomogeneous field varying at a rate imparting increased velocity to at least a portion of the electrons in said beam.

2. A high frequency amplifier comprising means for forming and projecting an electron beam along a path, said beam being characterized by the presence of both fast and slow mode noise waves thereon, first means positioned along said path for extracting from said beam fast mode noise waves, second means positioned along said path for modulating said beam in the fast mode with radio frequency energy, input means disposed along said path for introducing into fast mode coupling relationship with said beam a signal wave to be amplified, and output means downstream of said input means for extracting from the fast mode of the beam an amplified signal.

3. A high frequency amplifier comprising means for forming and projecting an electron beam along a path, said beam being characterized by the presence of both fast and slow mode noise waves thereon, first means positioned along said path in interacting relationship with said beam for extracting from said beam noise energy in the fast wave mode, second means positioned along said path in interacting relationship with said beam for modulating said beam in the fast wave mode only at a predetermined frequency, third means positioned along said path in interacting relationship with said beam for modulating said beam in the fast mode only with a signal to be amplified, means positioned along said path downstream of said second and third means in interacting relationship with said beam for extracting from said beam the signal energy on said beam in the fast wave mode only, and means for controlling the transit time of electrons in the beam past each of said means.

4. A high frequency amplifier comprising means for forming and projecting an electron beam along a path; first means positioned along said path for modulating said beam in the fast wave mode with radio-frequency energy, input means disposed along said path for introducing into fast mode coupling relationship with said beam a signal wave to be amplified, the effective frequency of said radio frequency energy being selected in correspondence with the frequency of said signal wave and said fast mode coupling relationship to enable the delivery of energy to said signal wave in an amount proportional to the energy in said signal wave, and output means downstream of said input means for extracting from the fast wave mode of the beam of an amplified signal.

5. An electron beam device for amplifying input signals of predetermined frequency comprising: means for projecting a stream of electrons along a predetermined path; means for creating in said path a field establishing electron resonance of the electrons in said stream; a coupler disposed along a first portion of said path for developing an input signal wave on said stream corresponding to said signal and to said field; means disposed downstream of said first coupler for subjecting said electrons to a periodic inhomogeneous pump field parametrically increasing the energy level of said input signal wave with the pump frequency being equal to the sum of the frequencies of said input signal and of the idler signal produced by the parametric process, at least one of said coupler and said pump field means having a propagation constant corresponding to a finite phase velocity at its assigned operating frequency with the pump frequency having a value sufficiently greater than the frequency of the input signal to assign said idler frequency a value higher than the frequency of said input signal by an amount sufficient to substantially attenuate the level of noise energy on said stream derived from the corresponding idler wave; and means disposed along said path for extracting amplified signal energy from said stream.

6. Signal amplifying apparatus comprising: means including an electron source for projecting an electron beam along a predetermined path; means for creating a condition of electron resonance for motion of the electrons in said beam; an input electron coupler disposed to interact with and develop upon said beam signals represented by motion of said electrons; a motion expander for subjecting said electrons to a periodic time-variable inhomogeneous field the periodicity of which is so related to said condition as to enable the delivery of energy to a component of said motion in proportion to the energy in said component; and an output electron coupler disposed to interact with and extract amplified signals from said beam.

7. Signal amplifying apparatus comprising: means including an electron source for projecting an electron beam along a predetermined path with said electron beam exhibiting fast electron waves representing noise; means for creating a condition of electron resonance for motion of the electrons in said beam; signal means including an input electron coupler for interacting in the fast-wave mode with and developing upon said beam signals represented by motion of said electrons and for interacting with and extracting said noise components; a motion expander for subjecting said electrons to a periodic inhomogeneous field the periodicity of which is so related to said condition as to enable the delivery of energy to a component of said motion in proportion to the energy in said component; and an output electron coupler disposed to interact with and extract amplified signals from said beam.

8. Apparatus as defined in claim 7 in which said input electron coupler has an effective electrical length along said path equal to an integral multiple of the wavelength of the slow electron wave on said beam at the frequency of said signals.

9. Apparatus as defined in claim 7 in which said output coupler interacts only with said fast electron waves at said signal frequency.

10. Apparatus as defined in claim 7 in which the operation of said expander develops an idler wave on said beam and said signal means extracts noise from said idler wave.

11. Apparatus as defined in claim 10 in which $$\beta_1+\beta_2=\beta_3$$

where $\beta_1$ is the propagation constant of said input electron coupler for said signals, $\beta_3$ is the propagation constant of said expander for a driving signal wave which creates said inhomogeneous field, and $\beta_2$ is the propagation constant on said beam for said idler wave.

12. Apparatus as defined in claim 10 in which said input electron coupler both develops signal waves on said beam and extracts noise from said signal and idler waves.

13. Apparatus as defined in claim 10 in which $$\omega_1+\omega_2=\omega_3$$

where $\omega_1$ is the frequency of said signals, $\omega_3$ is the frequency of said inhomogeneous field and $\omega_2$ is the idler frequency.

14. Apparatus as defined in claim 13 in which said inhomogeneous field is developed in response to a local oscillator signal having said frequency $\omega_3$ and said output electron coupler is responsive to signals at said idler frequency $\omega_2$.

15. Apparatus as defined in claim 10 in which said input electron coupler develops signal waves on said beam and said signal means additionally includes a second electron coupler disposed between said electron source and said expander for interacting with and extracting noise from said idler wave.

16. Apparatus as defined in claim 15 in which said component of motion is in a direction transverse to said beam path, said idler wave is in the transverse mode and said second electron coupler exhibits a finite phase velocity, at the frequency of said idler wave, corresponding to that of said idler wave.

17. Signal amplifying apparatus comprising: means including an electron source for projecting an electron beam along a predetermined path; means for creating a condition of transverse electron resonance for transverse motion of the electrons in said beam; an input electron coupler disposed to interact with and develop upon said beam signals represented by transverse motion of said electrons; a transverse motion expander for subjecting said electrons to a transverse periodic inhomogeneous field component the periodicity of which is so related to said condition as to enable the delivery of energy to a component of said transverse motion in proportion to the energy in said component; and an output electron coupler disposed to interact with and extract amplified signals from said beam.

18. Apparatus as defined in claim 17 in which said input electron coupler exhibits an infinite phase velocity substantially at the frequency of said signals and in which the signal frequency is substantially equal to the electron resonance frequency.

19. Apparatus as defined in claim 17 in which said expander effectively exhibits an infinite phase velocity at the frequency corresponding to said periodicity and the latter frequency is approximately twice that of said electron resonance.

20. Apparatus as defined in claim 17 in which said expander effectively exhibits a finite phase velocity at the frequency corresponding to said periodicity and the latter frequency is less than twice that of said electron resonance.

21. Apparatus as defined in claim 17 in which said expander effectively exhibits a finite phase velocity at the frequency corresponding to said periodicity and the latter frequency is greater than twice that of said electron resonance.

22. Apparatus as defined in claim 17 in which said expander effectively exhibits a finite phase velocity at the frequency corresponding to said periodicity and the latter frequency is less than that of said electron resonance.

23. Apparatus as defined in claim 17 in which the periodicity of said field is assigned a value such that as viewed by the moving electrons in accordance with Doppler effect the field appears to change at a rate substantially twice the frequency of said electron resonance.

24. Apparatus as defined in claim 17 in which the lines of force of said inhomogeneous field, as measured in a plane transverse to said path, diverge in a direction from the center of the path outwardly to one side thereof.

25. Apparatus as defined in claim 17 in which said condition creating means is an electric field.

26. Apparatus as defined in claim 17 in which said expander includes a first series of pairs of deflector plates individually spaced on opposite sides of said path and interspersed with a second such series of pairs of deflector plates, said first and second series instantaneously being of opposite polarities to create said inhomogeneous field.

27. Apparatus as defined in claim 26 in which said first and second series are biased respectively at potentials above and below the potential of said beam and said pairs are so spaced along the beam path as to constitute, by electrostatic focusing, said condition creating means in the portion of said path encompassed by said expander.

28. Apparatus as defined in claim 17 in which said input electron coupler exhibits a finite phase velocity at the frequency of said signals.

29. Apparatus as defined in claim 28 in which said input electron coupler includes a pair of transmission lines disposed individually on opposite sides of the beam path.

30. Apparatus as defined in claim 28 in which the frequency of said signals is less than that of said electron resonance and in which said input coupler develops signal waves on said beam moving in a direction toward said electron source.

31. Apparatus as defined in claim 28 in which the frequency of said signals is greater than that of said electron resonance and in which said input coupler develops signal waves on said beam moving in a direction away from said source.

32. Apparatus as defined in claim 17 in which said condition creating means is a magnetic field.

33. Apparatus as defined in claim 32 in which said magnetic field has its flux lines substantially parallel with said beam path.

34. Apparatus as defined in claim 32 in which the strength of said magnetic field in the portion of said path encompassed by one of said couplers and said expander is different from its strength in another of such portions.

35. Apparatus as defined in claim 32 in which said field is of substantially the same strength in the portions of said path encompassed by said couplers and said expander.

36. Signal amplifying apparatus comprising: means including an electron source for projecting an electron beam along a predetermined path; means for creating a condition of cyclotron electron resonance for motion of the electrons in said beam; an input electron coupler disposed to interact with and develop upon said beam signals represented by cyclotron-wave motion of said electrons; a motion expander for subjecting said electrons to a transverse periodic inhomogeneous field the periodicity of which is so related to said condition as to enable the delivery of energy to a component of said motion in proportion to the energy in said component; and an output electron coupler disposed to interact with and extract amplified signals from said beam.

37. Signal amplifying apparatus comprising: means including an electron source for projecting an electron beam along a predetermined path; means for creating a condition of electron resonance for motion of the electrons in said beam; an input electron coupler disposed to interact with and develop on said beam fast electron waves representing input signals; a motion expander, including a pair of deflectors individually disposed on opposite sides of said beam path and a resonant negative-resistance load coupled across said deflectors, for subjecting said electrons to a time-variable field effective to amplify a component of said motion an amount proportional to the amplitude of said component; and an output coupler disposed to interact with said fast electron waves and extract amplified signals from said beam.

38. The method of amplifying signals comprising the steps of: projecting an electron beam along a predetermined path; establishing a condition of electron resonance for motion of the electrons in said beam; imparting to said electrons resonant motion representative of a signal; subjecting said electrons to a periodic time-variable inhomogeneous field the periodicity of which is so related to said condition as to enable the delivery of energy to a component of said motion in proportion to the energy in said component; and extracting amplified signals from said beam.

39. The method of amplifying signals comprising the steps of: projecting an electron beam along a predetermined path with said electrons exhibiting fast-electron waves representative of noise components; establishing a condition of electron resonance for motion of the electrons in said beam; imparting to said electrons resonant motion representative of a signal and creating on said beam signal-representative fast-electron waves; extracting said noise components from said fast-electron waves; subjecting said electrons to a periodic inhomogeneous field the periodicity of which is so related to said condition as to enable the delivery of energy to a component of said motion in proportion to the energy in said component; and extracting amplified signals from said beam.

40. The method of amplifying signals comprising the steps of: projecting an electron beam along a predetermined path; establishing a condition of electron resonance for motion of the electrons in said beam having a component in a direction transverse to said path; imparting to said electrons a resonant transverse component of motion representative of a signal; subjecting said electrons to a periodic inhomogeneous field the periodicity of which is so related to said condition as to enable the delivery of energy to a component of said motion in proportion to the energy in said component; and extracting amplified signals from said beam.

41. The method of amplifying signals comprising the steps of: projecting an electron beam along a predetermined path; establishing a condition of electron resonance for motion of the electrons in said beam having a component in a direction transverse to said path; imparting to said electrons a resonant transverse component of motion representative of a signal and creating on said beam a signal-representative fast-electron wave; coupling said beam to a resonant negative-resistance load the resonance of which is so related to said component of motion as to enable an increase in the velocity of said resonant motion; and extracting amplified signals from the fast-electron wave on said beam.

42. The method of amplifying signals comprising the steps of: projecting an electron beam along a predetermined path; establishing a condition of electron resonance for motion of the electrons in said beam; imparting to said electrons resonant motion representative of a signal; subjecting said electrons to a periodic time-variable inhomogeneous field the periodicity of which is such that an electron in moving through one resonant cycle traverses four reversals of said field; and extracting amplified signals from said beam.

43. The method of amplifying signals comprising the steps of: projecting an electron beam along a predetermined path; establishing a condition of electron resonance for motion of the electrons in said beam; imparting to said electrons resonant motion representative of a signal; subjecting said electrons to a periodic time-variable inhomogeneous field the periodicity of which is so related to said condition and the inhomogeneity of which is such as to enable the delivery of energy to a component of said motion in linear proportion to the energy in said component; and extracting amplified signals from said beam.

44. The method of amplifying signals comprising the steps of: projecting an electron beam along a predetermined path; imparting to electrons in said beam motion representative of a signal and subjecting said electrons to a restoring-force field producing periodic electron motion corresponding to said signal and to said field; adding to said restoring-force field a periodic time-varying restoring-force-field component the periodicity of which is so related to said periodic electron motion as to enable the delivery of energy to a component of said motion in proportion to the energy in said component; and extracting amplified output signals from said electron beam.

45. The method of amplifying signals comprising the steps of: projecting an electron beam along a predetermined path; establishing a condition of cyclotron resonance for motion of the electrons in said beam having a component in a direction transverse to said path; imparting to said electrons a resonant transverse component of motion representative of a signal and creating on said beam signal-representative cyclotron waves; subjecting said electrons to a periodic inhomogeneous field the periodicity of which is so related to said condition as to enable the delivery of energy to a component of said motion in proportion to the energy in said component; and extracting amplified signals from said beam.

46. The method of amplifying signals comprising the steps of: projecting an electron beam along a predetermined path; establishing a condition of electron resonance for motion of the electrons in said beam having a component in a direction transverse to said path; imparting to said electrons a resonant transverse component of motion representative of a signal; subjecting said electrons to a periodic inhomogeneous field which is reversed in direction four times during each interval of electron motion corresponding to one period thereof; and extracting amplified signals from said beam.

47. The method of amplifying signals comprising the steps of: projecting an electron beam along a predetermined path; imparting to electrons in said beam signal-representative motion having at least a component in a direction transverse to said path and subjecting said electrons to a restoring-force field producing periodic electron motion corresponding to said signal and to said field; adding to said restoring-force field a transverse periodic restoring-force-field component the periodicity of which is so related to said periodic electron motion as to enable the delivery of energy to a component of said motion in proportion to the energy in said component; and extracting amplified signals from said beam.

48. The method of amplifying signals comprising the steps of: projecting an electron beam along a predetermined path; imparting to electrons in said beam motion having a component in a direction transverse to said path and subjecting said electrons to a restoring-force field producing periodic electron motion corresponding to said signal and to said field; adding to said restring-force field a periodically varying restoring-force-field component the variation of which relative to said motion is such that increased velocity is imparted to at least a portion of said electrons; and extracting amplified signals from said beam.

49. The method of amplifying signals comprising the steps of: projecting an electron beam along a predetermined path; establishing a condition of electron resonance for motion of the electrons on said beam having a component in a direction transverse to said path; imparting to said electrons a resonant transverse component of motion representative of a signal; subjecting said electrons to a periodically varying inhomogeneous field the periodicity of which as viewed from the moving electrons is approximately synchronous with the second harmonic of said resonant transverse component of said motion; and extracting amplified signals from said beam.

50. A method of amplifying signals comprising the steps of: projecting an electron beam along a predetermined path; creating a signal-representative fast-electron wave on said beam by interaction with input signals of a first frequency and establishing a condition of electron resonance for the electrons in said beam; modulating a driving signal, of a second frequency different from said first frequency, with input signals derived from said beam; subjecting said input-signal-carrying beam to an inhomogeneous field developed from said input-signal-modulated driving signal with said field developing on said beam a force component corresponding to said input-signal modulation and in phase with said input signals on said beam; and extracting signals from said beam subsequent to subjecting the beam to said field.

51. A method of amplifying signals comprising the steps of: projecting an electron beam along a predetermined path; establishing a condition of electron resonance for electrons in said beam; creating on said beam a signal-representative fast-electron wave by interaction with input signals of a first frequency; deriving input signals from said beam; modulating a driving signal, of a frequency different from said first frequency, with said derived input signals; developing an inhomogeneous field from said modulated driving signal; subjecting the input-signal-carrying beam to said inhomogeneous field; and extracting signals from said beam subsequent to subjecting the beam to said field.

52. The method of amplifying signals comprising the steps of: projecting an electron beam along a predetermined path; establishing a condition of resonance for electrons in said beam; creating on said beam electron waves representative of input signals; subjecting said beam to a field created from a driving signal, of a frequency different from that of said input signals, modulated by said input signals; and extracting amplified input signals from said beam.

References Cited by the Examiner

UNITED STATES PATENTS

| | | | |
|---|---|---|---|
| 2,245,670 | 6/1941 | Hollmann | 313—62 XR |
| 2,246,121 | 6/1941 | Blewett | 313—156 XR |
| 2,366,556 | 1/1945 | Blewett | 313—153 XR |
| 2,598,301 | 5/1952 | Rajchman | 313—62 XR |
| 2,600,373 | 6/1952 | Moore | 315—3 XR |
| 2,638,539 | 5/1953 | Cuccia | 315—5.27 |
| 2,794,936 | 6/1957 | Huber | 315—3.6 |
| 2,806,974 | 9/1957 | Haeff | 315—3.6 |
| 2,830,221 | 4/1958 | Dodds | 315—39.3 XR |
| 2,870,368 | 7/1958 | Cuccia | 315—5.49 |

OTHER REFERENCES

W. H. Louisell and C. F. Quate: "Parametric Amplification of Space Charge Waves," Proceedings of the I.R.E., pages 707 to 716, April 1958.

ROY LAKE, *Primary Examiner.*

ELI J. SAX, ARTHUR GAUSS, *Examiners.*